(12) United States Patent
Moore

(10) Patent No.: US 10,067,973 B2
(45) Date of Patent: Sep. 4, 2018

(54) DOUBLE-TIME ANALYSIS OF OIL RIG ACTIVITY

(71) Applicant: Halliburton Energy Services, Inc., Houston, TX (US)

(72) Inventor: James W. Moore, Denver, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 128 days.

(21) Appl. No.: 15/036,412

(22) PCT Filed: Dec. 12, 2013

(86) PCT No.: PCT/US2013/074550
§ 371 (c)(1),
(2) Date: May 12, 2016

(87) PCT Pub. No.: WO2015/088529
PCT Pub. Date: Jun. 18, 2015

(65) Prior Publication Data
US 2016/0275133 A1 Sep. 22, 2016

(51) Int. Cl.
*G06F 19/00* (2018.01)
*G06F 17/30* (2006.01)
(Continued)

(52) U.S. Cl.
CPC ........ *G06F 17/30371* (2013.01); *E21B 47/00* (2013.01); *G01V 11/00* (2013.01);
(Continued)

(58) Field of Classification Search
CPC ........ E21B 41/00; E21B 47/00; E21B 47/024; E21B 47/12; E21B 49/00; G01V 11/00;
(Continued)

(56) References Cited

U.S. PATENT DOCUMENTS 6,028,970 A 2/2000 DiPiazza et al.
8,290,272 B2 10/2012 Filimonova et al.
(Continued)

FOREIGN PATENT DOCUMENTS

WO 2013/074095 A1 5/2013

OTHER PUBLICATIONS

International Preliminary Report on Patentability issued in related Application No. PCT/US20131074550, dated Jun. 23, 2016 (12 pages).
(Continued)

*Primary Examiner* — Elias Desta
(74) *Attorney, Agent, or Firm* — John Wustenberg; Baker Botts L.L.P.

(57) ABSTRACT

A method and apparatus for collection and analysis of oil rig activity is described. The method includes collecting wellsite data from a plurality of sources, including real-time data sources and macroscopic reports. In certain embodiments, the collected data may be standardized based on templates specifying data format and presentation. Additionally, the data may be automatically corrected by using data error lists that identify algorithms for diagnosing and correcting errors in the data. Data collected from multiple sources may be time-aligned so that data from different sources may be correlated together by time. In certain embodiments, time aligning the data may include adjusting manually-logged timestamps for events in macroscopic reports based on real-time data. In this way, heterogeneous data from a plurality of sources may be homogenized. Optionally, the homogenized data may be used as inputs for wellsite data analysis or to produce various types of quality reports.

20 Claims, 14 Drawing Sheets

(51) Int. Cl.
*E21B 47/00* (2012.01)
*G01V 11/00* (2006.01)
*G06F 11/07* (2006.01)
*E21B 47/024* (2006.01)
*E21B 47/12* (2012.01)
*E21B 49/00* (2006.01)

(52) U.S. Cl.
CPC ...... *G06F 11/0706* (2013.01); *G06F 11/0751* (2013.01); *G06F 11/0787* (2013.01); *G06F 11/0793* (2013.01); *G06F 17/30368* (2013.01); *E21B 47/024* (2013.01); *E21B 47/12* (2013.01); *E21B 49/00* (2013.01)

(58) Field of Classification Search
CPC ............. G06F 11/0751; G06F 11/0793; G06F 17/30368
See application file for complete search history.

(56) References Cited

U.S. PATENT DOCUMENTS

| | | | |
|---|---|---|---|
| 2010/0084131 A1 | 4/2010 | Bouzas et al. | |
| 2011/0272144 A1 | 11/2011 | Belcher et al. | |
| 2012/0026002 A1 | 2/2012 | Vu et al. | |
| 2012/0303326 A1 | 11/2012 | Waid et al. | |
| 2014/0083688 A1* | 3/2014 | Rojas | E21B 44/00 166/250.01 |
| 2015/0053482 A1* | 2/2015 | Boone | E21B 44/00 175/24 |
| 2015/0149092 A1* | 5/2015 | Hancher | E21B 49/003 702/9 |

OTHER PUBLICATIONS

International Search Report and Written Opinion issued in related PCT Application No. PCT/US2013/074550 dated Aug. 26, 2015, 15 pages.
Esser, Daniel, et al. "Automatic indexing of scanned documents: a layout-based approach." IS&T/SPIE Electronic Imaging. International Society for Optics and Photonics, 2012.
"SiteCom—Safer, Faster, and Better Informed Drilling Decisions," Kongsberg Oil & Gas Technologies, 2 pages.
"ProSource E&P Data Management System," Schlumberger at https://www.software.slb.com/products/prosource?tab=Library &subtab=ProductSheets.
"ProSource E&P Data Management System," Schlumberger, https://www.software.slb.com/products/prosource?tab=Library &subtab=ProductSheets, 4 pages, published 2012.
"SiteCom—Safer, Faster, and Better Informed Drilling Decisions," Kongsberg Oil & Gas Technologies, 2 pages, published May 2016.

* cited by examiner

DOUBLE-TIME ANALYSIS OF OIL RIG ACTIVITY

CROSS-REFERENCE TO RELATED APPLICATIONS

This application is a U.S. National Stage Application of International Application No. PCT/US2013/074550 filed Dec. 12, 2013, which is incorporated herein by reference in its entirety for all purposes.

BACKGROUND

The present disclosure relates generally to oil field exploration and, more particularly, to a system and method for analysis of oil rig activity.

The measurement of various types of data during oil rig activities is well known in the subterranean well drilling and completion art. Real-time data is generated from, for example, wellsite sensors, measurement-while-drilling/logging-while-drilling tools, and software application logs. Additionally, macroscopic reports may be generated that record wellsite metadata (e.g., type of drillbit, casing information, etc.) and data reflecting wellsite operations during flat time (i.e., time during which real-time sensors are not changing). Macroscopic reports may also include the wellsite operators' manual logs of operations.

The analysis of the various data is well known in the art. However, such data analysis and reporting may be difficult and time consuming when data may be fragmented across different data sources, unstandardized, and/or contain errors. Data analysis must usually be performed either entirely manually or with substantial manual oversight. Further, it may be difficult to combine or compare data from multiple wellsites, or between wellsites overseen by different operating companies, due to the different methods and formats for data gathering and recording.

FIGURES

Some specific exemplary embodiments of the disclosure may be understood by referring, in part, to the following description and the accompanying drawings.

Figure 1:
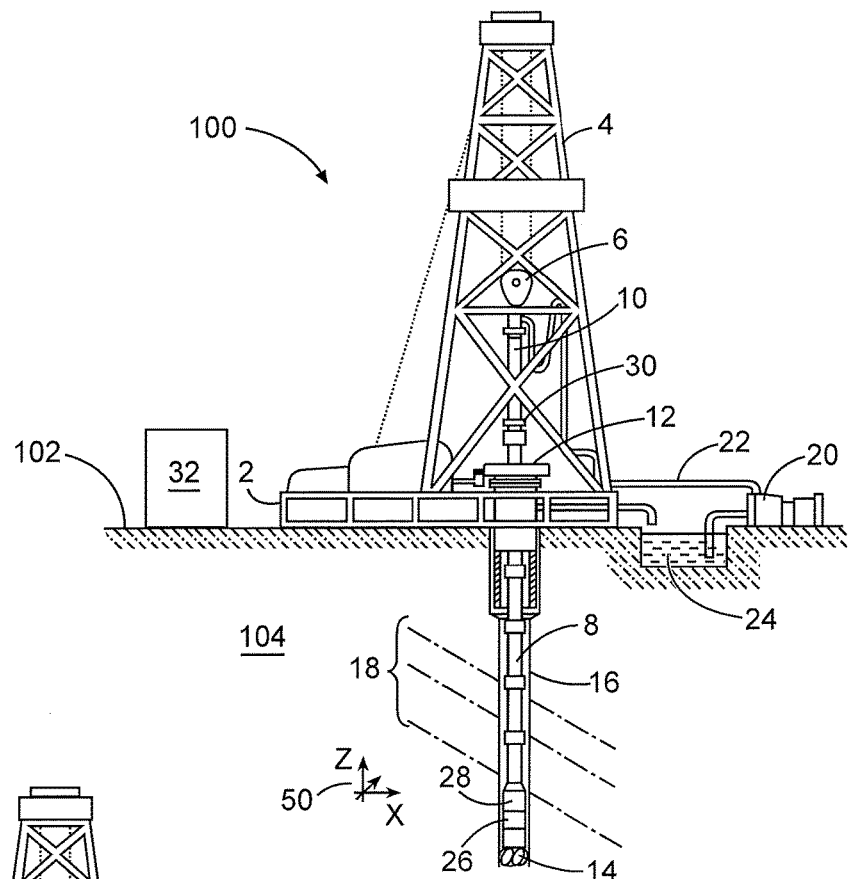
FIG. 1 is a diagram showing an illustrative logging while drilling environment, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), solid state drives, and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

FIG. 1 is a diagram of a subterranean drilling system 100, according to aspects of the present disclosure. The drilling system 100 comprises a drilling platform 2 positioned at the surface 102. In the embodiment shown, the surface 102 comprises the top of a formation containing one or more rock strata or layers 18, and the drilling platform 2 may be in contact with the surface 102. In other embodiments, such as in an off-shore drilling operation, the surface 102 may be separated from the drilling platform 2 by a volume of water.

The drilling system 100 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 100 may comprise a bottom hole assembly (BHA) coupled to the drill string 8 near the drill bit 14. The BHA may comprise a LWD/MWD tool 26 and a telemetry element 28. In certain embodiments, the LWD/MWD tool 26 may be integrated at any point along the drill string 8. The LWD/MWD tool 26 may include receivers and/or transmitters (e.g., wired pipe, antennas capable of receiving and/or transmitting one or more electromagnetic signals). In some embodiments, the LWD/MWD tool 26 may include a transceiver array that functions as both a transmitter and a receiver. As the bit extends the borehole 16 through the formations 18, the LWD/MWD tool 26 may collect measurements relating to various formation properties as well as the tool orientation and position and various other drilling conditions. The orientation measurements may be performed using an azimuthal orientation indicator, which may include magnetometers, inclinometers, hall effect sensors, and/or accelerometers, though other sensor types such as gyroscopes may be used in some embodiments. In embodiments including an azimuthal orientation indicator, resistivity and/or dielectric constant measurements may be associated with a particular azimuthal orientation (e.g., by azimuthal binning). The telemetry sub 28 may transfer measurements from the LWD/MWD tool 26 to a surface receiver 30 and/or to receive commands from the surface receiver 30. Measurements taken at the LWD/MWD tool 26 may also be stored within the tool 26 for later retrieval when the LWD/MWD tool 26 is removed from the borehole 16.

In certain embodiments, the drilling system 100 may comprise an information handling system 32 positioned at the surface 102. The information handling system 32 may be communicably coupled to the surface receiver 30 and may receive measurements from the LWD/MWD tool 26 and/or transmit commands to the LWD/MWD tool 26 though the surface receiver 30. The information handling system 32 may also receive measurements from the LWD/MWD tool 26 when it is retrieved at the surface 102. In certain embodiments, the information handling system 32 may process the measurements to determine certain characteristics of the formation 104 (e.g., resistivity, permeability, conductivity, porosity, etc.) In some cases, the measurements and formation characteristics may be plotted, charted, or otherwise visualized at the information handling system 32 to allow drilling operators to alter the operation of the drilling system 100 to account for downhole conditions.

Figure 2:
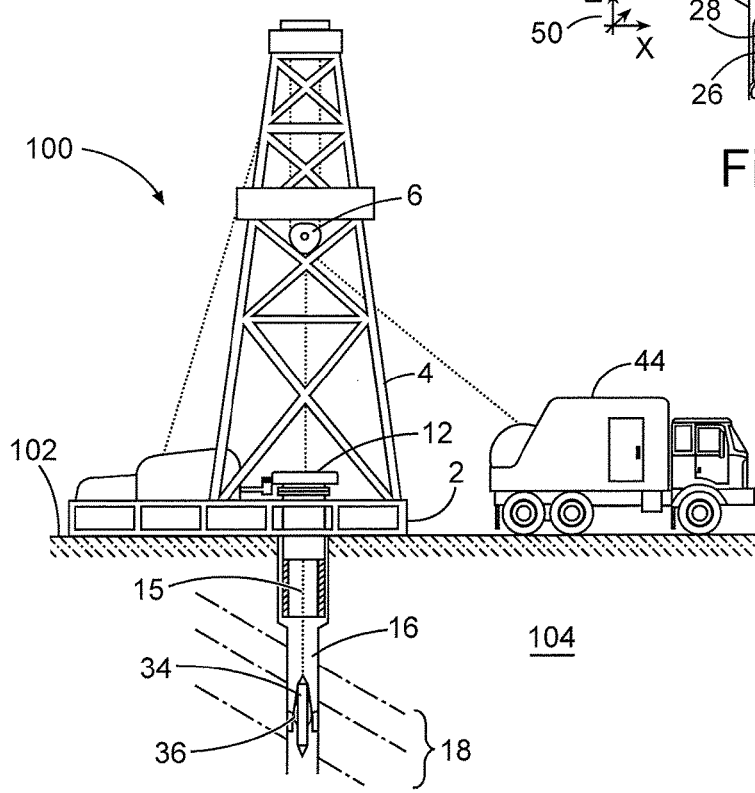
FIG. 2 is a diagram showing an illustrative wireline logging environment, according to aspects of the present disclosure.

At various times during the drilling process, the drill string 8 may be removed from the borehole 16 as shown in FIG. 2. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may include one or more logging/measurement tools 36 having transmitters, receivers, and/or transceivers similar to those described above in relation to the LWD/MWD tool 26. The logging/measurement tool 36 may be communicatively coupled to the cable 15. A logging facility 44 (shown in FIG. 1 as a truck, although it may be any other structure) may collect measurements from the logging tool 36, and may include computing facilities (including, e.g., an information handling system) for controlling, processing, storing, and/or visualizing the measurements gathered by the logging tool 36. The computing facilities may be communicatively coupled to the logging/measurement tool 36 by way of the cable 15. In certain embodiments, the information handling system 32 may serve as the computing facilities of the logging facility 44.

Figure 3:
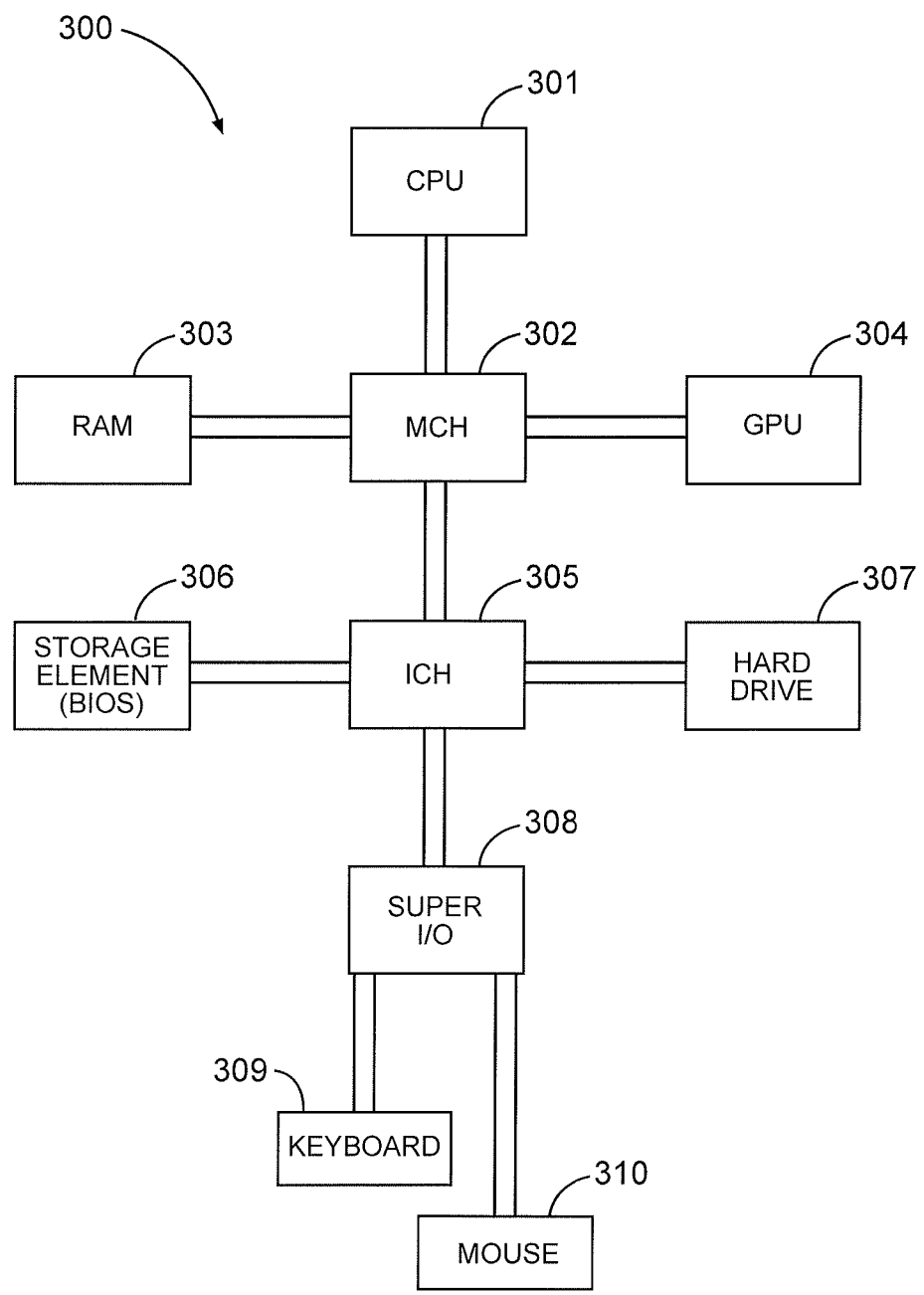
FIG. 3 is a diagram of an example information handling system, according to aspects of the present disclosure

FIG. 3 is a block diagram showing an example information handling system 300, according to aspects of the present disclosure. Information handling system 300 may be used with the drilling system described above and with other subterranean drilling systems. In certain embodiments, some or all of the steps shown in FIGS. 4-16 and discussed below may be performed by one or more information handling systems 300.

The information handling system 300 may comprise a processor or CPU 301 that is communicatively coupled to a memory controller hub or north bridge 302. Memory controller hub 302 may include a memory controller for directing information to or from various system memory components within the information handling system, such as RAM 303, storage element 306, and hard drive 307. The memory controller hub 302 may be coupled to RAM 303 and a graphics processing unit 304. Memory controller hub 302 may also be coupled to an I/O controller hub or south bridge 305. I/O hub 305 is coupled to storage elements of the computer system, including a storage element 306, which may comprise a flash ROM that includes a basic input/output system (BIOS) of the computer system. I/O hub 305 is also coupled to the hard drive 307 of the computer system. I/O hub 305 may also be coupled to a Super I/O chip 308, which is itself coupled to several of the I/O ports of the computer system, including keyboard 309 and mouse 310. The information handling system 300 further may be communicably coupled to one or more elements of a drilling system though the chip 308 as well as a visualization mechanism, such as a computer monitor or display.

The information handling systems described above may include software components that process and characterize data and software components that generate visualizations from the processed data. As used herein, software or software components may comprise a set of instructions stored within a computer readable medium that, when executed by a processor coupled to the computer readable medium, cause the processor to perform certain actions. In the case of a data characterization/processing component, the set of instructions may cause the processor to receive "raw" data from a data source (e.g., measurements from a LWD/MWD tool), and to process the "raw" using various algorithms or other processing techniques that would be appreciated by one of ordinary skill in the art in view of this disclosure and the purposes to be achieved by the data processing. In the case of a software component that generates visualizations, the set of instructions may cause the processor to receive processed data from a data characterization/processing component and generate a visualization (e.g., chart, graph, plot, 3-D environment, etc.) based on that data.

Figure 4:
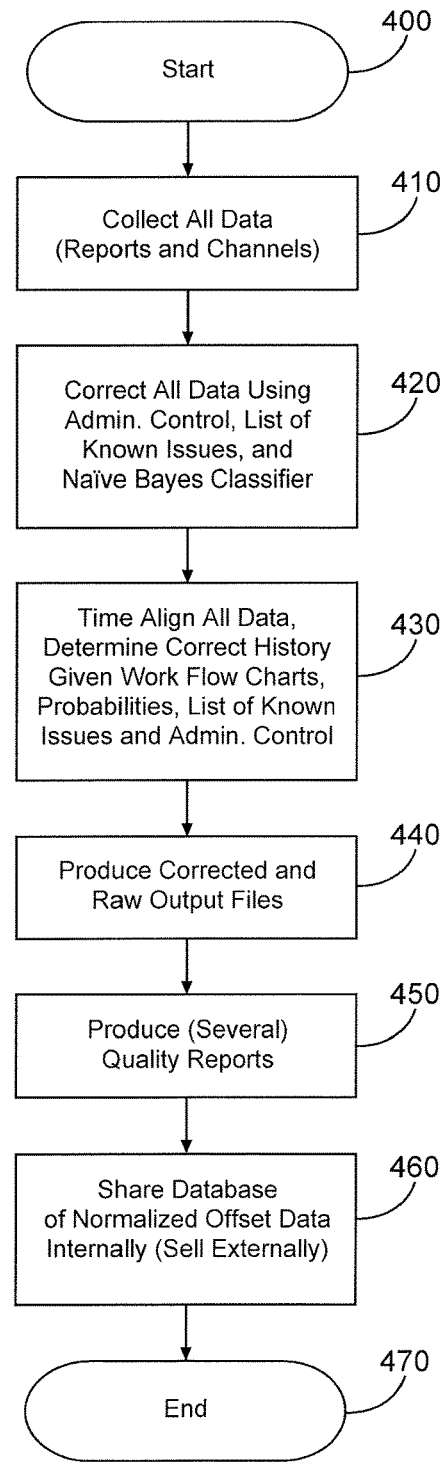
FIG. 4 is a flowchart showing an overview of the steps for analyzing oil rig activity, according to the present disclosure.

FIG. 4 is a flowchart showing an overview of steps for analyzing wellsite activity, according to the present disclosure. At start 400, one or more oil rig sites (such as the embodiments shown in FIGS. 1-2) may be carrying out various operations in the oilfield exploration and production process. For example, a wellsite may be engaged in drilling operations, production operations, and/or logging/measurement operations.

At step 410, data concerning wellsite operations may be recorded and aggregated together from various sources. Data may be generated and captured in real-time; for example, the Wellsite Information Transfer Specification (WITS) is a petroleum-industry standard for recording and transmitting wellsite data such as, for example, hookload, drill torque, and weight-on-bit. Data may also include non-realtime-data, such as after-the-fact work history reports. All data, regardless of source, may be collected, aggregated, and stored in information handling systems known to those of skill in the art, such as the information handling system embodiment of FIG. 3.

At step 420, errors or inconsistencies in the data collected in step 410 may be corrected. Corrections may be made, for example, by manual administrative intervention or by automated processes such as algorithmic analysis of data consistency, cross-checking against other data sources, naive Bayes classification, or other data mining techniques known to those of skill in the art. Corrections may also include standardization of data, such as standardizing data units and format.

At step 430, the data collected in step 410 and corrected in step 420 may be time aligned so that data from different sources may be correlated together by time. In certain embodiments, time aligning the data may include adjusting manually-logged timestamps for events in work history reports based on real-time data. For example, automatically collected real-time data concerning bit depth may be used to adjust a work-report event timestamp for picking up the bottom-hole assembly. Time alignment decisions may be made using, for example, process map flow charts, probabilistic analysis, and optional manual administrative intervention. In this way, data from various sources, including manually recorded data, may be time aligned with the real-time data and an accurate reconstruction of work history may be generated.

At step 440, output files may be produced. The output files may optionally reflect the raw collected data gathered in step 410, the data after the corrections of step 420, or the data after the time-alignment process of step 430.

At step 450, one or more quality reports may be produced. The quality reports may be based on an analysis of the output files generated in step 440. Quality reports may be used to flag results of pass/fail criteria, such as frequent motor stalls, excess weight-on-bit, etc. Additionally or alternatively, quality reports may be used for comparative metrics, such as wellsite efficiency. Comparisons may be made based on, for example, the equipment used, wellsite characteristics, operational decisions, and/or personnel.

At step 460, the data and reports collected and generated in step 410, 420, 430, 440, and 450 may be shared. The data may be, for example, normalized for integration into a broader internal database. Additionally or alternatively, it may be sold externally to third parties.

At end 470, the steps shown in FIG. 4 may optionally be repeated to collect, correct, analyze, and share additional data.

Each of the overview steps of FIG. 4 are discussed in further detail with respect to FIGS. 5-17 below. Moreover, although the steps of FIG. 4 are shown as discrete steps in a linear order, it may be understood in light of the present disclosure that the steps may overlap or be performed in a different order than the one shown. For example, output files of corrected data (step 440) may be produced before the data is time aligned (step 430). Similarly, quality reports (step 450) may be generated during data collection (step 410).

Aggregating and Pre-Processing Data

Figure 5:
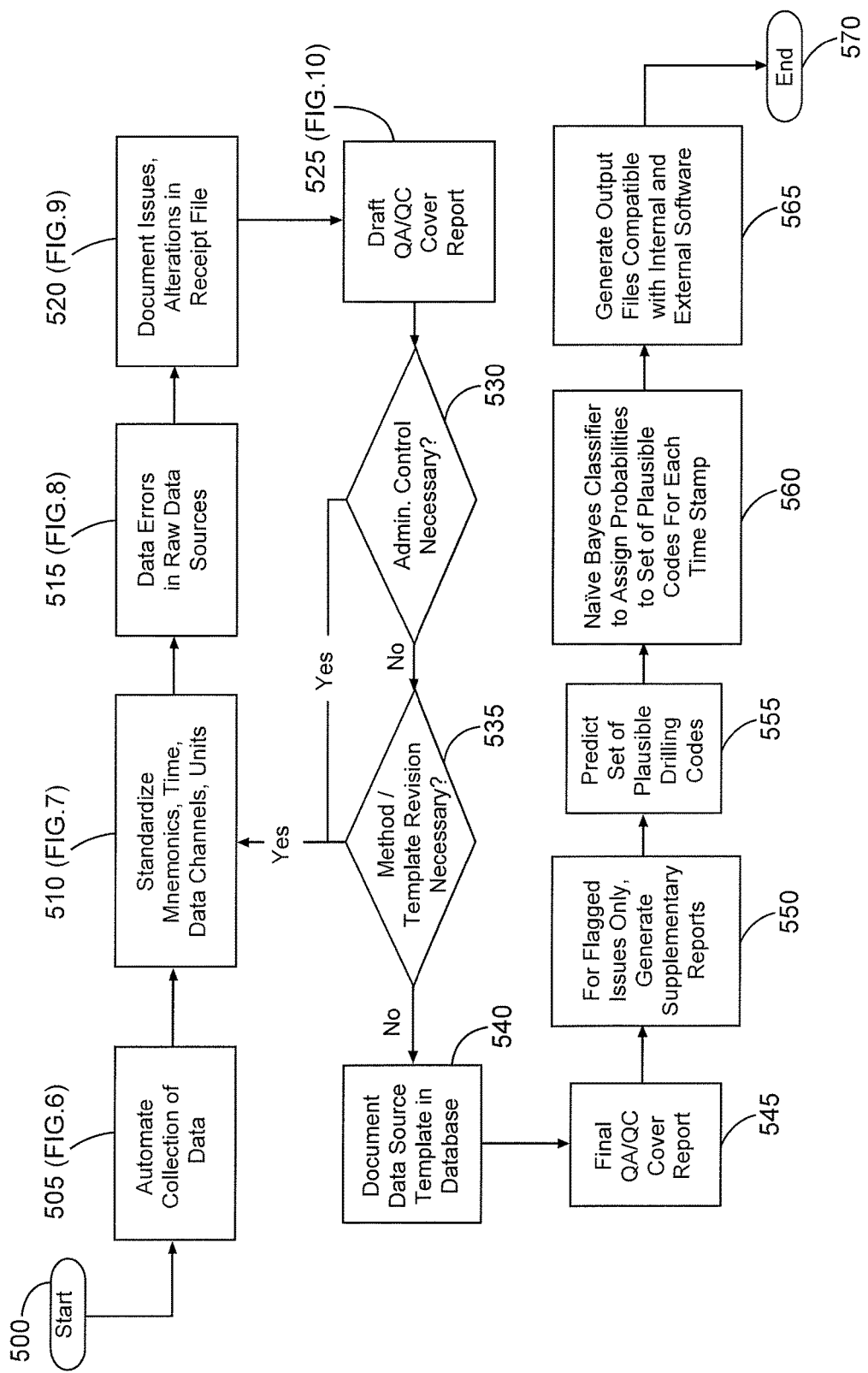
FIG. 5 is a flowchart showing one embodiment of steps for aggregating and pre-processing data, according to the present disclosure.

FIG. 5 is a flowchart showing one embodiment of steps for aggregating and pre-processing data, according to the present disclosure. At start 500, one or more wellsites may be carrying out various operations as discussed above with respect to step 400 of FIG. 4. During wellsite operations, data and measurements may automatically be generated in real-time by various sources known to those of skill in the art, such as wellsite sensors, MWD/LWD tools, and software application logs.

Figure 6:
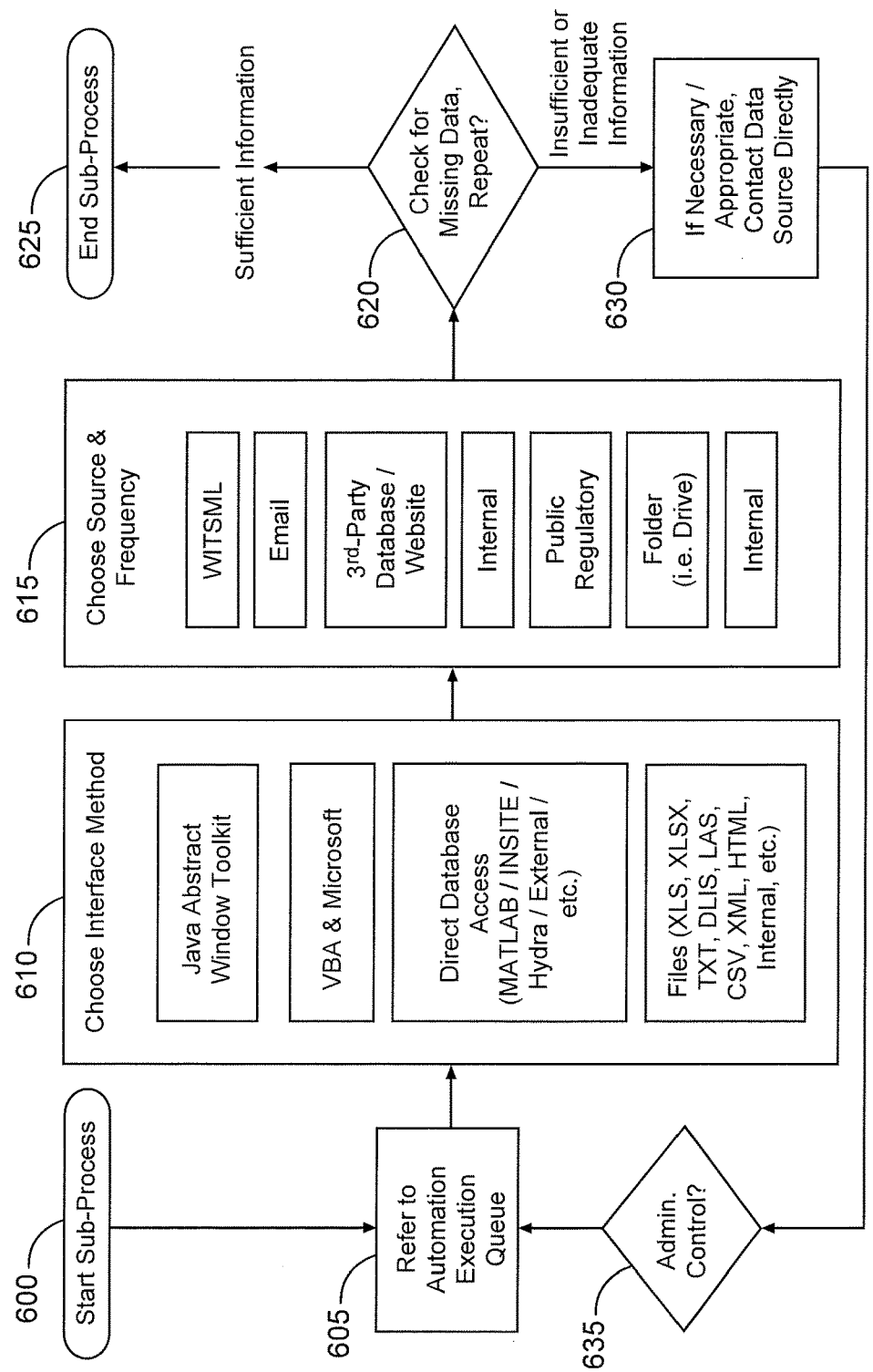
FIG. 6 is a flowchart showing one embodiment of steps for automatically collecting wellsite data, according to the present disclosure.

At step 505, wellsite data may be automatically collected. An embodiment for automatically collecting data is shown in FIG. 6 and discussed below.

Figure 7:
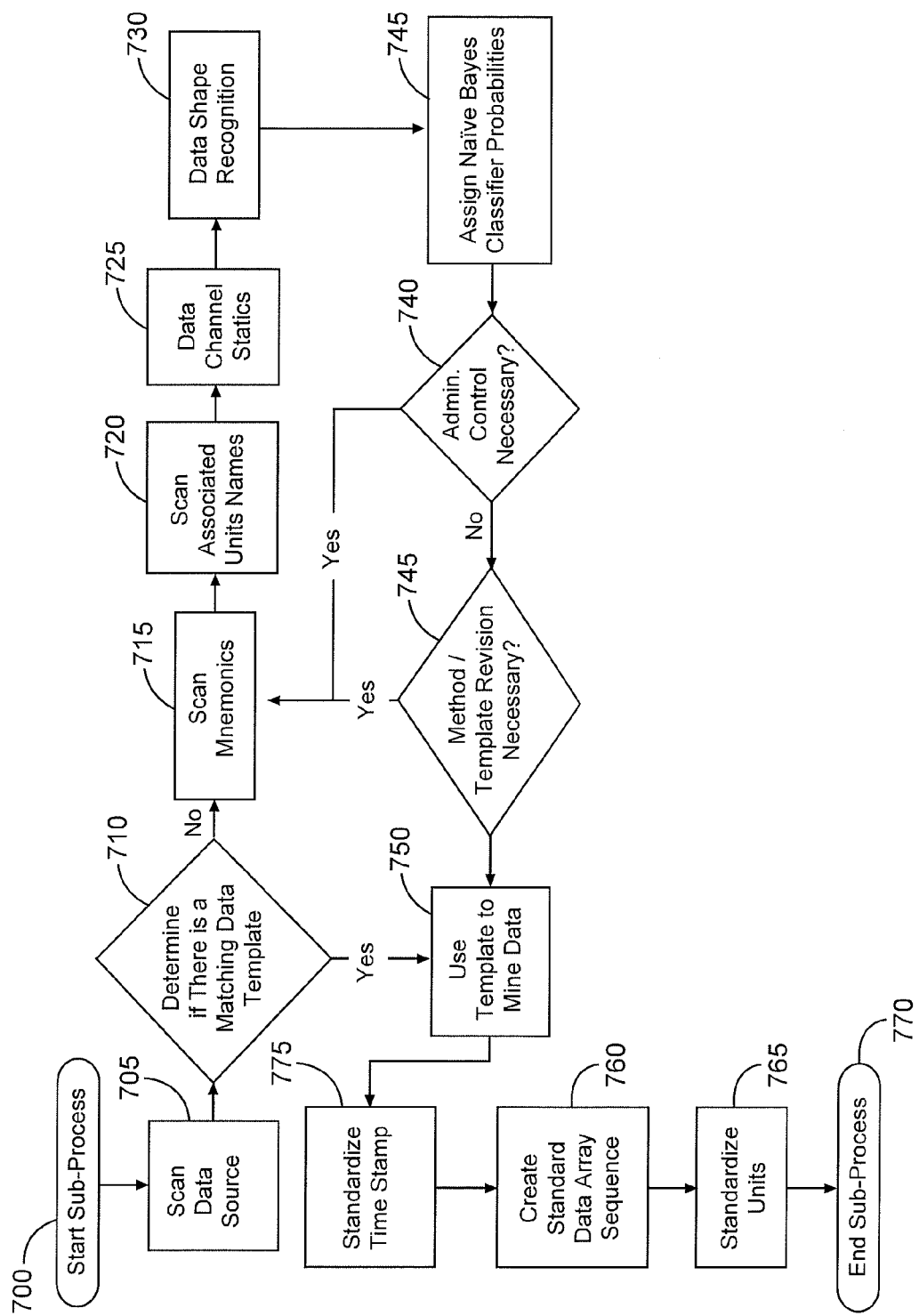
FIG. 7 is a flowchart showing one embodiment of steps for standardizing collected wellsite data, according to the present disclosure.

At step 510, the collected data may be standardized to account for differences in formatting, units, naming conventions, etc. An embodiment for standardizing the collected data is shown in FIG. 7 and discussed below.

Figure 8:
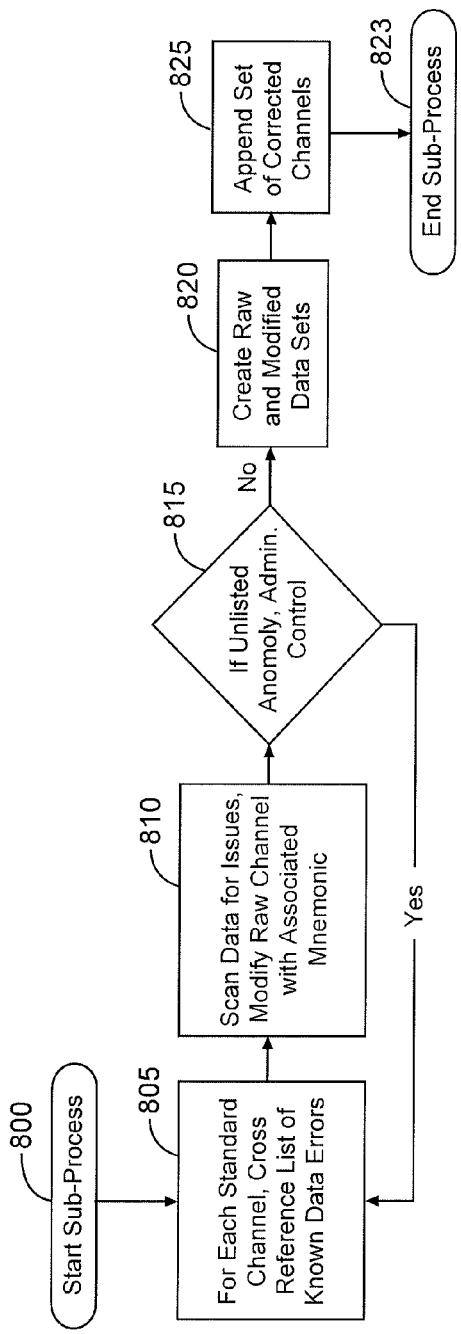
FIG. 8 is a flowchart showing one embodiment of steps for identifying and correcting errors in wellsite data, according to the present disclosure.

At step 515, errors in the collected data may be identified and corrected. An embodiment for identifying and correcting errors is shown in FIG. 8 and discussed below.

Figure 9:
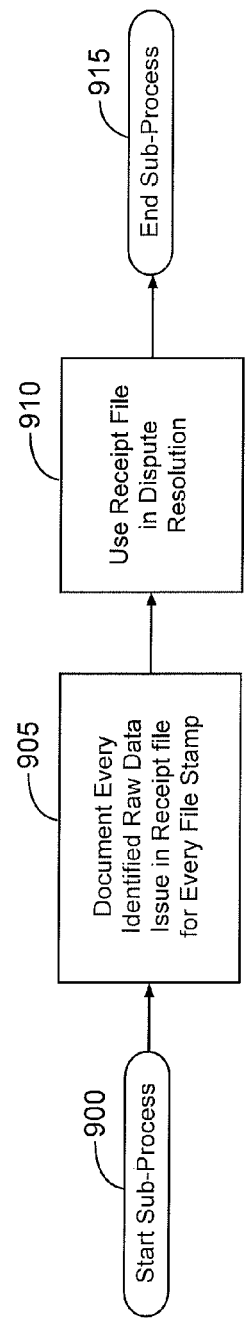
FIG. 9 is a flowchart showing one embodiment of steps for documenting data issues and alterations in a receipt file, according to the present disclosure.

At step 520, all issues concerning the raw data collected in step 505, and the alterations made in step 515 to correct those issues, may be documented in a receipt file. An embodiment for documenting data issues and alterations is shown in FIG. 9 and discussed below.

Figure 10:
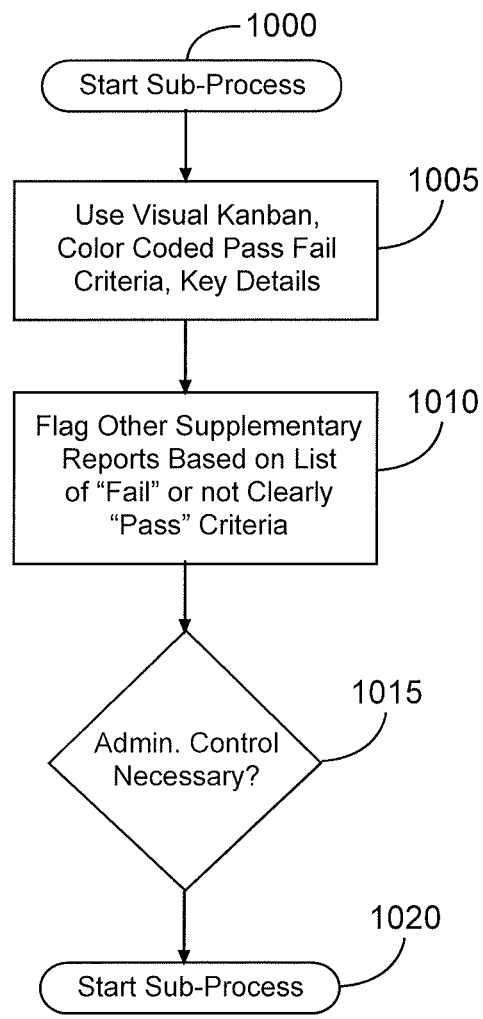
FIG. 10 is a flowchart showing one embodiment of steps for preparing a QA/QC cover report from wellsite data, according to the present disclosure.

At step 525, a draft quality-assurance/quality-control ("QA/QC") cover report may be prepared based on the corrected data and a template that specifies the format of the report. Based on the template instructions, the report prepared in step 525 may contain some or substantially all of the corrected data from step 515 and the receipt file from step 520, for example on a timestamp-by-timestamp basis. The template may also specify pass-fail or other evaluation criteria to apply to the data. The evaluation may identify wellsite operation failures (or, in some embodiments, identify "not clearly pass" scenarios), such as frequent motor stalls, excessive sliding time, inadequate cement measurements, etc. An embodiment for preparing reports is shown in FIG. 10 and discussed below.

At step 530, the draft QA/QC report produced in step 525 may be reviewed to determine whether it conforms to the expected template and reflects an accurate comparison of the data against the evaluation criteria. If the report contains an incorrect data presentation or an unexpected evaluation result, for example because of an incorrect unit conversion in step 510 or a faulty error-correction decision in step 515, the administrator may intervene to manually resolve any identified issues in steps 510, 515, or 520. Thereafter, steps 510 through 525 may be resumed to generate a draft QA/QC report and verify correct data presentation and evaluation.

At step 535, the draft QA/QC report produced in step 525 may be reviewed to determine whether the template used to produce the report may need to be revised. For example, the review of step 535 may determine that a different data presentation is desired or that the pass-fail criteria is generating unhelpful or misleading wellsite operation evaluations. If necessary the evaluation criteria may be revised to produce more accurate results, or the template may be revised to select different evaluation criteria or data presentation. Thus, in step 530, the QA/QC report may be reviewed to verify that data is being correctly processed and/or evaluated according to the selected template and evaluation criteria; in step 535, the QA/QC report may be reviewed to verify the accuracy and utility of the selected template and evaluation criteria.

At step 540, any template that was used for generating the QA/QC cover report may be documented in a database. In this way, a record of the templates used to prepare the report may be preserved. Due to the verification in steps 530 and 535, it may be desirable to reuse the same templates for future QA/QC reports from the same data source or wellsite. Additionally or alternatively, documenting the templates may facilitate revision of all QA/QC cover reports produced using a specific template in case of later revisions to that template.

At step 545, a final QA/QC cover report may be obtained based on successful completion of the steps 525, 530, and 535 for producing and evaluating draft QA/QC cover reports, as described above.

At step 550, supplementary reports may be generated based on issues flagged during the production of final QA/QC cover report in step 545. For example, a record of reoccurring issues may be generated to identify and diagnose persistent wellsite operation errors. In situations where information may be needed to allocate fault for a wellsite operation error, supplementary reports may provide forensic reconstruction of wellsite operations and measurements that may be used for root cause analysis. For example, a supplementary report may be generated that may compare the real-time data available to the wellsite operator at the time of a wellsite operation error and compare it to the data following the standardization and error-correction process of steps 510, 515, and 520. In situations where the raw data differs from the corrected data due to, for example, calibration errors, an erroneous wellsite operations decision may thereby be traced to a failure to follow correct calibration procedures.

At step 555, the corrected data generated in step 515 may be examined to identify plausible drilling codes on a timestamp-by-timestamp basis. The drilling codes may, for example, be the drilling codes promulgated by the International Association of Drilling Contractors for identifying drilling operations such as drilling on bottom, slides, rotations, etc. Algorithmic analysis may be performed on the corrected data to identify plausible codes that are consistent with, for example, corrected data concerning bit depth, rotary torque, etc.

At step 560, a naive Bayes classifier may be used to assign probabilities to each of the plausible codes (identified in step 555). As may be appreciated by those of skill in the art in light of the present disclosure, the naive Bayes classifier may be trained using sample data sets matching drilling codes to various data parameters. Based on that training data, the naive Bayes classifier of step 560 may use probabilistic analysis of the available corrected data to assign likelihoods to each of the plausible drilling codes. In this way, the most likely of the plausible drilling codes may automatically be identified for each timestamp. If the probabilities assigned using the naïve Bayes classifier do not reveal a dominant conclusion, an administrator may be prompted to manually analyze the situation and make a decision using the interface.

At step 565, an output file may be generated comprising the aggregated and pre-processed data according to the present method. The output file may be formatted to be compatible with various software packages, such as Halliburton's MaxActivity™ or WELLPLAN™ or Schlumberger's Petrel®.

Thus, according to the embodiment of FIG. 5, at end step 570 wellsite operations data may have been automatically collected, corrected, output to cover reports, evaluated against pass-fail or other criteria, assigned probabilistic drilling codes, and/or formatted for use in other software applications.

FIG. 6 is a flowchart showing one embodiment of steps for automatically collecting wellsite data, according to the present disclosure. The steps may begin at step 600 with a request for automatic data collection.

At step 605, an automation execution queue may be activated. The automatic execution queue may comprise an execution script and/or other software program code that may identify the sources and methods for collection of wellsite data.

At step 610, an interface method specified by the automatic execution queue may be chosen for collecting and storing of the wellsite data. For example, the automatic collection routines may interface via file-types known to those of skill in the art (such as XML, CSV, TXT, etc.). In alternative example embodiments, the chosen interface may be direct access to a known database format, such as Halliburton's INSITE®, or via Java's Abstract Window Toolkit. If direct database access is granted (internal/external), interface software may be used to read and write from the database automatically.

At step 615, a data source specified by the automatic execution queue may be chosen for data collection. The data source may include a variety of different sources known to those of skill in the art. For example, one possible data source known to those of skill in the art is network-distributed data in the Wellsite Information Transfer Standard Markup Language (WITSML) format. Additionally or alternatively, data sources may include, for example, 3rd-party databases, a network share folder, public regulatory information (which may be posted to the internet), or e-mail. In addition to specifying the data source, the automatic execution queue may also specify the frequency of data retrieval. Real-time WITSML data, for example, may be retrieved every minute or second, while public regulatory data may be collected once a week or month.

At step 620, the automatic execution process may check the adequacy of the data collection. If sufficient information has been collected—for example, if enough data for the desired reporting period has been collected—the automatic collection of data may end at step 625. If sufficient information has not been collected, the collection of information may be resumed.

At step 630, the data source may be contacted directly if necessary or appropriate. For example, if sufficient information had not been collected at step 620 because of a data reporting failure (e.g., a website failing to update with expected new data), an automated attempt may be made to communicate with the data source to resolve the error (e.g., an automated reconnect attempt). In this way, temporary data source errors may be resolved in an automated way, without requiring administrator intervention.

At step 635, the automatic data collection administrator may optionally intervene if necessary or appropriate, such as in situations where the automated error-recovery in step 630 is unsuccessful. The administrator may take remedial actions such as, for example, modifying the automatic execution queue to identify alternative data sources or to remove requests for collection from a non-responsive data source. Regardless of whether the administrator exercises the option to intervene for manual control, the automatic collection of data may resume at step 605 with a new cycle of the automatic execution queue.

FIG. 7 is a flowchart showing one embodiment of steps for standardizing collected wellsite data, according to the present disclosure. The steps may begin at step 700 with a request to standardize collected data. At step 700, one or more data standardization templates may be provided, for example as library files available to the program software code executing the subroutine shown as FIG. 7. The data standardization templates may specify the desired type and format of standardized data and may vary based on data type or intended data use. For example, a template may be provided for drilling operations that specifies a presentation format for drilling operation data such as weight-on-bit, rotary torque, bit-depth, etc. Another template may be provided for cementing operations that may specify the presentation format for flow rates, fluid volume pumped, cement-bond-logging data, etc. In this way, templates may describe how various types of data from one or more data sources may be formatted and presented for consistent recording and evaluation.

At step 705, the source of the data is scanned and identified. In one embodiment, this may be, for example, information provided by the automatic execution queue program code in steps 605, 610, and 615 discussed above.

At step 710, it may be determined whether an available data standardization template is known to match the data source identified in step 705. If a template is identified that matches the data source identified in step 705, then that template may be applied in step 750. If a template is not identified as matching the data source, an automatic template scanning and selection procedure may be initiated.

At step 715, the data may be scanned to identify data labeling information, such as for example wellsite data mnemonics labels. Mnemonics labels are used by those of skill in the art to describe the content of wellsite data measurements. Each mnemonic label may be used to identify the data channel, the property being measured, and/or the unit being used to measure that property. For example, the mnemonic label DSF_PICK_UP_WEIGHT may identify a data channel reporting the pick up weight measured with the drillstring off the hole bottom and moving up; an associated property may be the Pickup_Hook_Load, the driller's estimate of the average pickup hook load (pickup weight) over the reporting period; and the unit quantity may be HighForce, a unit reflecting either one thousand kilograms of force or one thousand pounds of force depending on the format of the reporting data channel.

Although mnemonics have standardized usages and definitions known to those of skill in the art, in practice the application of mnemonics to data logging may be inconsistent and subject to error, including failing to include a mnemonic label or error in usage of proper measurement units. Accordingly, one advantage of the present invention, discussed below, is the automatic analysis and standardization of mnemonic usage and labeling.

At step 720, the data may be scanned to identify unit names. For example, in the case of the DSF_PICK_UP_WEIGHT mnemonic discussed above, the HighForce unit name may be scanned to identify whether the data channel reported using one thousand kilograms of force or one thousand pounds of force. At step 725, the data may be analyzed to scan for overall data channel statistics, which may be used in step 730 for data recognition.

At step 730, data shape recognition may be performed based on the results of the scan for mnemonics, unit names, and data channel statistics. Data shape recognition may be performed using mathematical set theory. In certain embodiments, for example, drilling data may identify "in-slips" data using raw hookload data after interpreting how hookload measurements changed throughout the process of drilling the well. Once such data sets are dissected into drilling stands, the Pick-Up, Slack-Off, and Rotating Off-Bottom data may be identified using a process flow map and the raw data. Drilling practice procedures, specific to each rig/customer, may be verified and explain anomalies in the data. Good and bad procedures may follow characteristic shapes and responses that populate a reference library. Those shapes may be compared in isolation in an automatic loop or array search. Local statistics may be useful in analyzing isolated sets; in the case of failure, historical offset time data may be substituted, cross-checked, and verified to be useful. In certain embodiments of shape recognition, regression and analysis may be performed. Based on queries from the administrator when outliers arise, complete libraries may be expanded over time to include obscure possibilities. Furthermore, by automatic analysis of the overall data, errors in mnemonic labeling (or the absence of mnemonic labeling) may be identified and corrected according to the present disclosure. For example, if a mnemonic label is present but the units are not identified, contextual data and other data statistics may be used to predict the correct unit label. Similarly, if a mnemonic label is incorrect or missing, information about the source of the data, contextual information from other data, and statistical analysis of the data may be used to make a prediction regarding the correct mnemonic label. Mathematical relationships may exist between parameters until discrete events occur. For example, strokes, flow, and pressure may be related by meta data; until the meta data changes as a discrete time event, the relationship may hold pending other influences that may also be automatically identifiable. As another example, a calibration may be performed while drilling a well that may explain, for example, why the Pick-Up, Slack-Off, Rotating-Off Bottom, and Weight-on-Bit are trending incorrectly either before or after the calibration. Data from a wellsite may be incorrect or indicative of issues that lead to useful interpretation. For example, hole cleaning issues, changes in mud properties, excessive tortuosity, etc., may cause characteristic data shapes to show apparent errors in slack-off weight trends. In this way, the root cause of the response may be identified according to the embodiments of the present disclosure.

At step 735, a naive Bayes classifier may be used to select the most likely associated standardization template based off the data analysis conducted in steps 715, 720, 725, and 730. As discussed above with respect to the use of a naive Bayes classifier to assign probabilities to drilling codes (step 560 of FIG. 5), the classifier may be trained using sample data and the judgment of the administrator so as to minimize the end-user interaction.

At step 740, the results of the naive Bayesian classifier may be reviewed to determine whether the input data from step 705 has been accurately processed such that a likely matching template has been properly selected. As with the similar step 530 concerning reviewing QA/QC cover reports, if the result at step 740 is a determination that automated data processing and evaluation (steps 715 through 735) has generated an erroneous template identification, an administrator may manually intervene to correct the error, and the process may be resumed at step 715.

At step 745, the selected template may be reviewed to determine whether the template or the method used to select it may be in need of revision. If a revision to the template is needed, the revision may be made and the automatic process of analyzing data may be resumed at step 715. If the template is determined to not need revision, the process may proceed to step 750 where the template may be applied. The executing software code may note the selected template so that when data from the same source is evaluated in future iterations of step 710, the selected template may automatically be matched, obviating the need to repeat steps 715 through 745.

At step 750, the selected template may be used to mine data from the sources identified in step 705. The template may specify which data to collect, how often to collect it, etc.

At step 755, the data may be uniformly time-stamped according to the presentation format specified by the template. For example, the template may specify the granularity of time-stamps and the order or format of date and time presentations.

At step 760, the data may be aggregated into a standardized data array sequence as specified by the template. The selected template may include instructions concerning the presentation of the data within the data array sequence, such as the format of the data, the order of the data, etc.

At step 765, the units of data may be standardized. For example, data collected from different sources that use different units (such as one data source that uses kilograms and another that uses pounds) may be standardized. This may involve conversion routines to convert data that was collected in one unit to another unit specified by the template.

The data standardization process may complete at step 770. Thus, according to the embodiment of FIG. 7, data collected from various, heterogeneous sources at different times may be aggregated, organized, and standardized into homogenous data arrays according to prescribed template specifications. The mapping of input data to templates may be automated through data analysis procedures and assisted by naive Bayesian classification, including the automated correction of missing, inconsistent, or erroneous mnemonic labeling.

FIG. 8 is a flowchart showing one embodiment of steps for identifying and correcting errors in wellsite data, according to the present disclosure. The steps may begin at step 800 with a request to correct errors in data, for example data collected according to the embodiment of FIG. 6 and standardized according to the embodiment of FIG. 7. At step 800, one or more data error lists may be provided, for example as library files available to the program software code executing the subroutine shown as FIG. 8.

Those of skill in the art of well-drilling may commonly review wellsite data to identify errors and/or intentional or unintentional misrepresentation of data and events. Errors may fall into one or more of at least four categories, as described below.

Incomplete data: data channels where information was collected but is incomplete because of, for example, loss of data, intermittent data transmission, or erroneous starting and stopping of data recordation.

Inaccurate data: data channels where information was collected but appears to be inaccurate due to poor calibration, sensor drift, etc. This may be determined by looking at an individual data channel. For example, during the course of a single drilling run, a person of ordinary skill in the art would understand that hook load should remain relatively constant withstanding several possible influencing changes comprising mud weight changes, sudden changes in trajectory, etc. Thus, if a hook load data channel reports changing values during the course of a drilling run, this may be determined to reflect inaccurate sensor drift or inaccurate metadata, such as block weight, pipe weight per foot (as a function of grade and deterioration). Inaccurate data may also be identified in by cross-referencing other data. In certain embodiments, data collected from various different sources may reflect similar measurements conducted using different settings; for example, multiple data channels may each contain torque measurements. Inconsistencies between the measurements may reflect, for example, poor calibration settings or improper "zeroing" (e.g., taring) of one of the channels. This may be a frequent occurrence in differential measurements such as Differential Pressure and Weight-On-Bit. In certain embodiments, a standard procedure may be implemented for collecting those points and enforced throughout. Nonetheless, variations in drilling practices exist and templates may be configured to accommodate those changes.

Illogical data: data channels where information was collected but appears to be illogical. This may include data channels that are unexpectedly static, for example a data channel that reports that the drilling apparatus is "in slips," while other data channels show drilling operations commencing. This may be due to software errors, such as software incorrectly flagging a drill as being "in slips" when pressure is put on the drill pipe from the traveling assembly in order to drill a negative-weight well. Other illogical results may include, for example, large, unexpected discontinuities in bit-depth and hole-depth measurements.

Missing data: data channels or metadata where information was not collected. This may be caused, for example, by a broken sensor, incorrect wellsite setup, data loss due to downhole tool failure, or human failure to record the information correctly.

The data error lists provided at step 800 may algorithmically define an automated process for performing a review to identify errors in one or more of the categories listed above, or in other categories known to those of skill in the art. For example, a data error list may specify data channels that may be cross-referenced for consistency. The data error lists may also specify how the error should be flagged for logging into a receipt file, as discussed below with respect to the embodiment of FIG. 9. In certain embodiments, the data error lists may also provide remedial instructions for addressing the errors, such as specifying how inconsistencies in cross-checks should be resolved. The remedial procedures specified in the data error lists may optionally include instructions for modifying the data to correct errors. By providing instructions for diagnosing and resolving errors, data error lists may be similar to virus definition lists known to those of skill in the art.

At step 805, the standardized data may be analyzed to select relevant data error lists that should be applied to that channel.

At step 810, the standardized data may be scanned and the relevant data error lists applied. Where issues are detected, the instructions in the data error list may be followed, including correcting the error if the data error list so instructs. Any alterations to the input data may be logged.

At step 815, it may be determined whether any identified data anomalies were not addressed by the available data error lists. If any such anomaly exists, administrator control may be exercised to supplement the data error list and the process may be resumed starting at step 805. Additionally or alternatively, the administrator may manually correct the data.

At step 820, the complete raw and modified data sets may be created. In this way, the original data may be preserved but corrected data may be available for future analysis.

At step 825, the list of channels that were corrected may be appended to the data set. This may be used to identify, for example, reoccurring data channel errors so that remedial action may be taken.

The error detection and correction process may complete at step 830. Thus, according to the embodiment of FIG. 8, each data channel may be independently analyzed for errors according to a list of known issues. Data channels may also be analyzed and cross-referenced against information from other channels (especially duplicate channels with different "tare" or "zeroing" settings) to identify irregularities. Remedial actions, including correcting the data, may be taken automatically or through administrator intervention. The raw and corrected data may be recorded in order to maintain a complete forensic record of wellsite operations.

FIG. 9 is a flowchart showing one embodiment of steps for documenting data issues and alterations in a receipt file, according to the present disclosure. The steps may begin at step 900 with a request to document data issues and alterations. At step 900, raw and corrected data sets may be provided, optionally including an appended channel-correction list, for example as discussed in the embodiment of FIG. 8.

At step 905, every issue identified during data standardization and correction process may be logged to a receipt file. The logging may be performed on a channel-by-channel and timestamp-by-timestamp basis. The issues logged may include, for example, identification of corrected mnemonics or units in the standardization process, discussed above with respect to FIG. 7. It may also include, as further examples, identification of data issues flagged or errors corrected during the error identification process, discussed above with respect to FIG. 8.

At step 910, the receipt file may optionally be used in dispute resolution. For example, as discussed above with respect to step 550 of FIG. 5, information showing data that was available at the time of wellsite operations decisions may be compared to corrected data to perform a forensic analysis of wellsite operation errors for the purposes of fault allocation. It may also be possible to play back data for the purposes of training, reprimand, legal compliance, etc. The receipt file generation process may complete at step 915.

FIG. 10 is a flowchart showing one embodiment of steps for preparing a QA/QC cover report from wellsite data, according to the present disclosure. The steps may begin at step 1000 with a request to prepare a QA/QC cover report, for example based on data corrected in accordance with the embodiment of FIG. 8 discussed above. At step 1000, a QA/QC cover report template may be provided. The template may comprise instructions for the format and presentation of the report. For example, the template may specify key data to be emphasized in the report.

The template may also link to data evaluation criteria. Criteria may include, for example, Kanban presentations, a visual process management system known to those of skill in the art. The evaluation criteria may also include pass-fail criteria, such as for example verification criteria that determines whether expected data was properly collected (e.g., casing information data). Criteria may also include analytical routines to determine whether, for example, drilling occurred within dogleg limitations and/or whether drilling occurred outside of the payzone.

At step 1005, the report may be created according to the template instructions, including the automated construction of visual Kanban presentations, color-coded analysis against the pass-fail criteria, and the call-out of selected key data.

At step 1010, the need for supplementary reports may be flagged (or supplementary reports may be created) based on the results of the pass-fail criteria evaluation. This may include supplementary reports providing more detailed data concerning a "fail" result on a pass-fail criteria, as well as supplementary reports directed toward "not clearly pass" results in order to anticipate potential future issues.

At step 1015, administrative control may be exercised if necessary, for example because of an unexpected failure of a pass-fail criteria evaluation. The administrator may take remedial actions to correct any error in generating the report, and then resume the process of generating the report at step 1000. If no administrative intervention is necessary, a report may be output and the process completed at step 1020.

Macroscopic Report Interpretation

Figure 11:
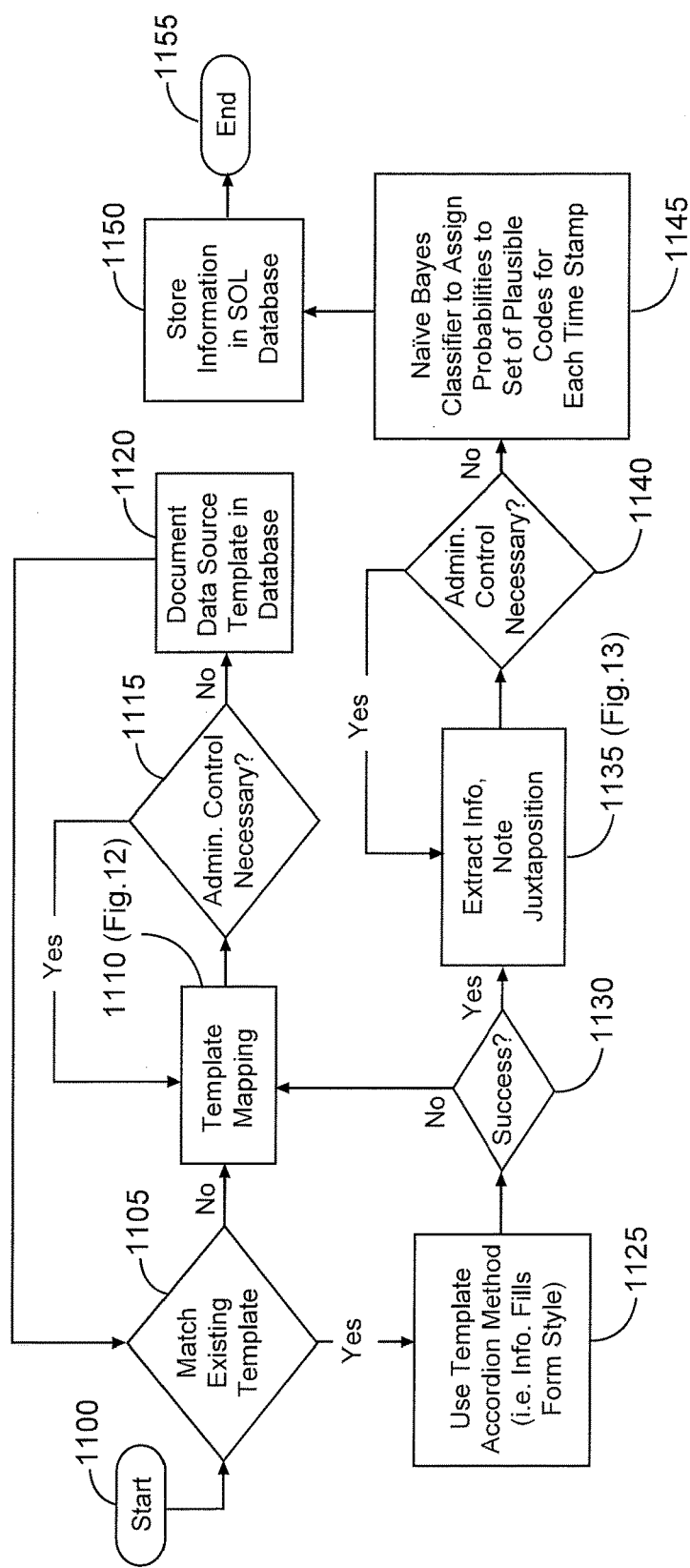
FIG. 11 is a flowchart showing one embodiment of steps for macroscopic report interpretation, according to the present disclosure.

FIG. 11 is a flowchart showing one embodiment of steps for macroscopic report interpretation, according to the present disclosure. Although data automatically generated during wellsite operations may have been collected in real-time by the procedures described above with respect to FIG. 5, additional wellsite data may be recorded in macroscopic wellsite reports that may not be provided in real-time. Such reports may include wellsite metadata describing operating parameters, such as for example the type of drillbit used, casing information relating to depths and sizes, bottom-hole assembly information, and other parameters known to those of the art. The wellsite reports may also include data reflecting wellsite operations during flat time (i.e., time during which real-time sensors are not changing), such as for example while the rig is being repaired. The macroscopic reports may also include the wellsite operators' manual logs of operations.

The steps necessary for interpretation of a macroscopic report may vary based on the complexity and irregularity of the macroscopic report. For example, information may be automatically collected from relatively simple macroscopic reports using standard optical character recognition techniques. Additionally or alternatively, digital format macroscopic reports may include metadata tags (e.g., XML tags) that facilitate the automatic extraction of report content. In such reports, data may be extracted using methods known to those of skill in the art.

On the other hand, metadata reports may contain more complex data presentations, lack metadata tags, and/or have irregular content and structure that may be difficult to automatically parse. As discussed in more detail below, the strategy of interpreting such reports may rely, for example, on analysis of report characteristics, such as identification of pixel lines that outline tables in rectangular and non-rectangular form. Similarly, a table in a report may comprise boxes with identifiable shape, width, height, line-thickness, shading, and other characteristics, and tables of boxes may be aligned adjacently with similar positions. The juxtaposition of tables may be static even if their page placement is dynamic depending on the amount of content in previous tables. Thus, a given macroscopic report may have a characteristic "fingerprint" that may aid in the identification and cross-reference of rules previously-used to gather information from similar macroscopic reports. Information that does not match any existing "fingerprint" or have associated logic for automatic interpretation may alert the administrator to provide one-time guidance or, alternatively, new interpretation rules to apply in the future. The data typically contained in macroscopic wellsite reports may therefore be automatically collected and interpreted according to the embodiment of FIG. 11.

At start 1100 one or more wellsites may have carried out various operations, as discussed above with respect to step 400 of FIG. 4 and step 500 of FIG. 5, and data concerning those operations may have been provided in one or more macroscopic reports. If the report was originally in a hard-copy format, at step 1100 it may have been scanned into a computer-readable format, such as PDF or BMP. Additionally, templates for the automatic extraction of data from the macroscopic reports may be provided in a template database. As will be discussed in greater detail with respect to FIGS. 12 and 13, macroscopic reports may not necessarily be of a fixed format. They may instead vary, or "accordion," in length depending on the amount and type of content. A template may define procedures for automatically interpreting a report, such as optical character and table recognition, and provide instructions for processing and extracting data from the report. For example, reports from a particular oilfield services company may have a substantially similar format, and so a specific template for processing reports from that company may be developed.

At step 1105, a macroscopic report may be analyzed to determine whether a matching template exists. If a template is found, it may be used in step 1125. If a matching template is not found, the template mapping procedure of step 1110 may be used.

Figure 12:
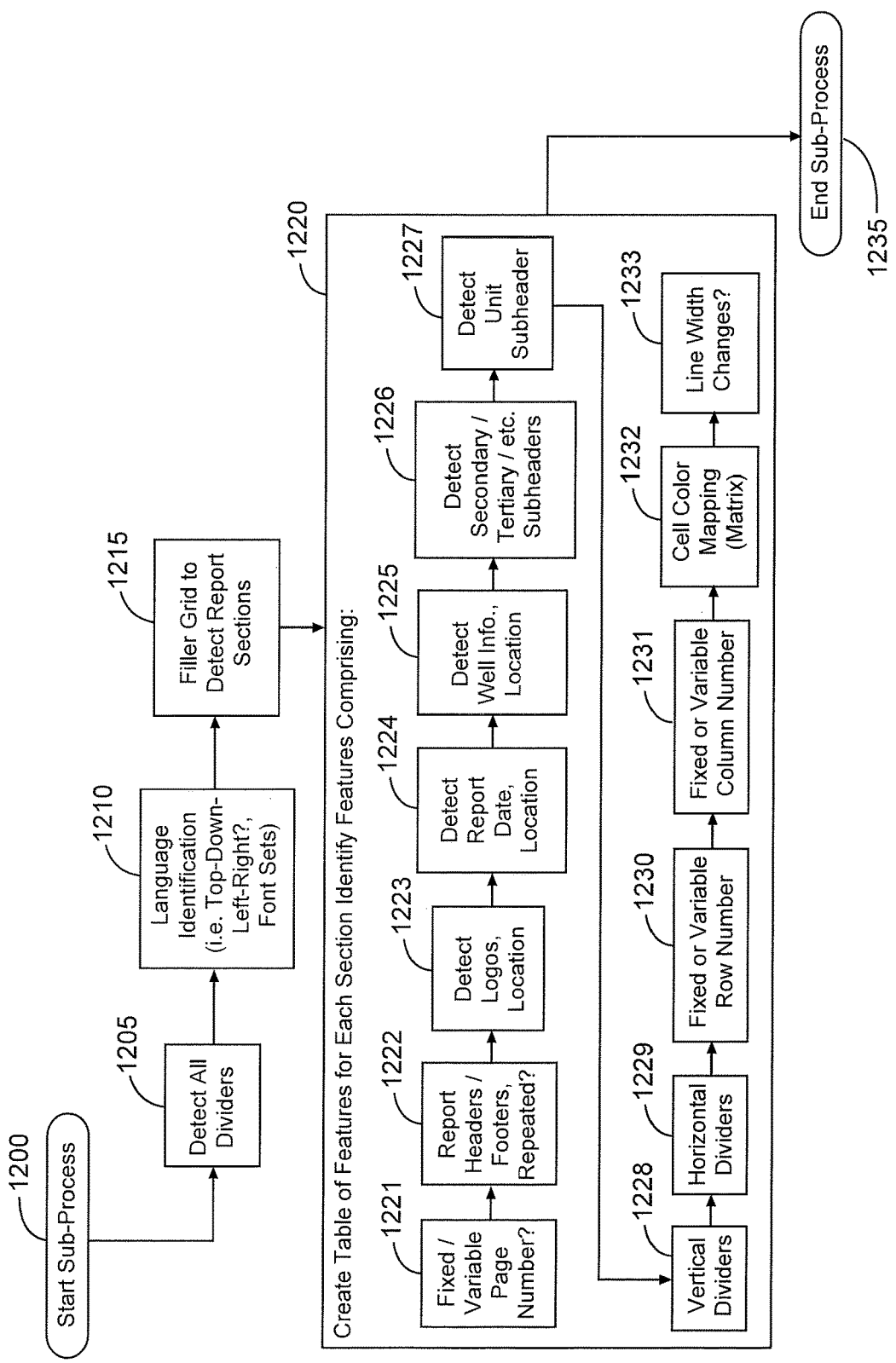
FIG. 12 is a flowchart showing one embodiment of steps for template mapping a macroscopic report, according to the present disclosure.

At step 1110, an automatic template mapping procedure may be used to create a template for the report analyzed in step 1105. An embodiment for template mapping is shown in FIG. 12 and discussed below.

At step 1115, administrative control may optionally be exercised if the template mapping procedure is not successful. For example, the administrator may manually intervene to correct errors produced by the automatic mapping procedure. If administrator intervention is necessary, the mapping procedure may be resumed at step 1110.

At step 1120, the template that has been created by the automatic mapping process may be logged into a template database, such that the correct template will be found when the matching template analysis is performed again at step 1105.

At step 1125, the template "accordion method" may be used to map the macroscopic report with the matched template. As discussed above, a macroscopic report may grow or shrink in size ("accordion") because of the type and quantity of data contained in any given report. A template may be able to adjust dynamically in order to map all of the data in a given report.

At step 1130, an evaluation is made as to whether the template used in step 1125 was a success. For example, a macroscopic report may add a new type of data or change its presentation of an old type of data. Under those circumstances, a previously matched template may need to be updated in order to map the new data presentation. Thus, at step 1130, if a matched template is not able to map the macroscopic report, the process may proceed to step 1110 to revise the template mapping. If the template "accordion method" is successful, however, the process may proceed to step 1135 to extract data from the macroscopic report.

Figure 13:
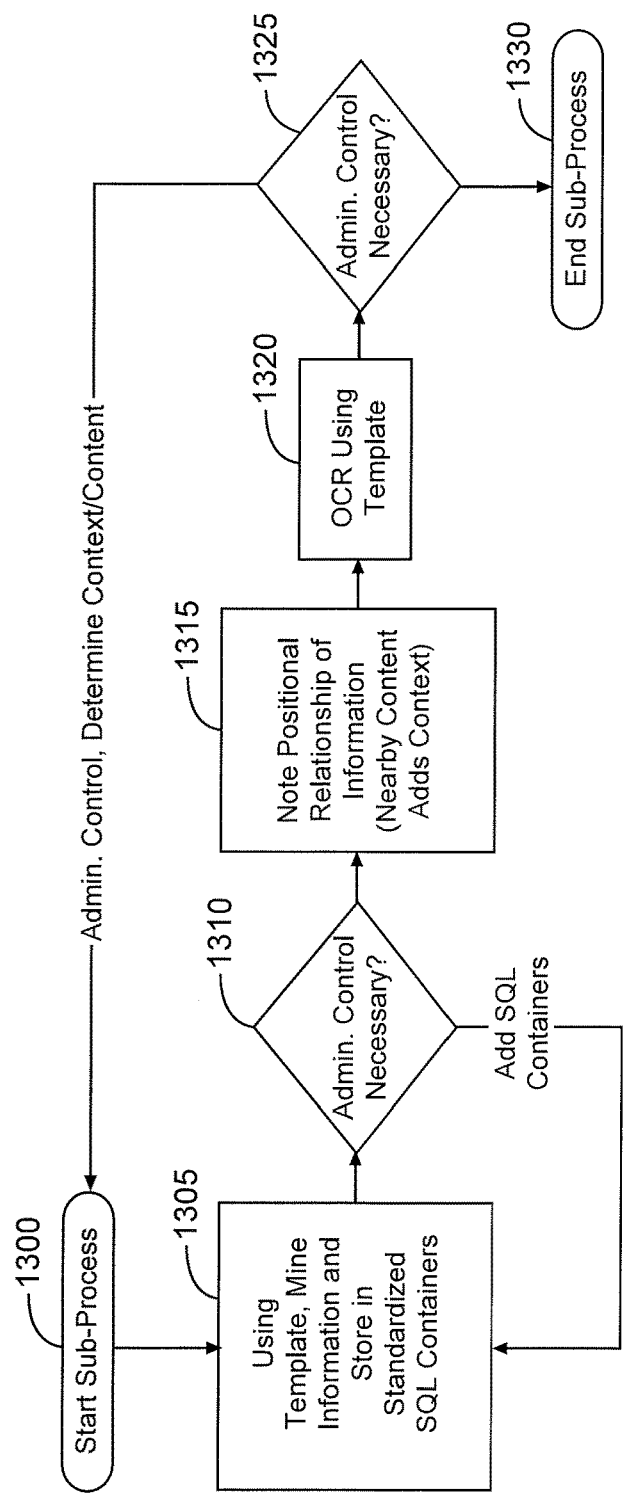
FIG. 13 is a flowchart showing one embodiment of steps for template mapping a macroscopic report, according to the present disclosure.

At step 1135, information may be extracted from the macroscopic report. An embodiment for information extraction is shown in FIG. 13 and discussed below.

At step 1140, administrative control may optionally be exercised if the data extraction procedure is not successful. For example, the administrator may manually intervene to correct errors produced by the extraction procedure. If administrator intervention is necessary, the mapping procedure may be resumed at step 1140.

At step 1145, the extracted data may be reviewed to assign plausible drilling or other codes on a timestamp-by-timestamp basis. As discussed above with respect to step 555, algorithmic analysis may be performed on the macroscopic report data to identify plausible drilling codes that are consistent with the collected data. Then, as discussed above with respect to step 560, a naive Bayes classifier may be used to assign probabilities to each of the plausible codes such that the most likely of the plausible drilling codes may automatically be identified for each timestamp.

At step 1150, the information extracted from the macroscopic reports, as well as the drilling code probabilities prepared in step 1145, may be exported, for example into an SQL database.

Thus, according to the embodiment of FIG. 11, at end step 1155 wellsite operations data may have been automatically extracted from macroscopic reports, assigned probabilistic drilling codes, and/or organized into a standardized output format for use in other software applications.

FIG. 12 is a flowchart showing one embodiment of steps for template mapping a macroscopic report, according to the present disclosure. Although the flowchart of FIG. 12 is discussed below with respect to a single macroscopic report, multiple similar macroscopic reports may be processed. In certain embodiments, before using the embodiment of FIG. 11 in an operational environment, the embodiment of FIG. 12 may be applied to numerous sample reports in order to ensure that robust templates are developed for mapping similar reports in the future.

The steps may begin at step 1200 with a request to template map a report (or, as discussed above, multiple reports). The steps 1205 through 1235 described below may be performed, for example, by image processing techniques known to those of skill in the art, such as optical character recognition and pixel analysis. Where available, the described steps may also take advantage of electronic metadata included with the report.

At step 1205, the report may be analyzed to detect dividers, such as page breaks, horizontal lines, vertical lines, and tables.

At step 1210, the report may be analyzed to identify language characteristics, such as font sets used, whether information is presented top-down and left-to-right, etc.

At step 1215, a filter grid may be used to identify each of the various sections of the reports based on the dividers identified in step 1205 and the language characteristics determined in step 1210. For example, it may be determined that one section of the report may comprise a specific header followed by a series of tables.

At step 1220, a subprocess comprising, for example, substeps 1221 through 1233 may be repeated for each of the sections identified in step 1215. Each iteration of the subprocess of step 1220 may generate a mapping table describing the presentation of information for a section. For example, the mapping table may specify the organization, format, and data content of the section. The mapping table may be used in step 1115 and 1135 discussed above to map the same section in another macroscopic report and extract information. The subprocess of step 1220 may be repeated for each of the sections identified in step 1215 so that a mapping table of features may be created for each of the report sections identified in step 1215.

At substep 1221, the section selected in step 1220 may be analyzed to determine whether it has a fixed or variable page number. For example, a report summary section identifying the report date and wellsite location may always appear on the first page of the report. By comparison, a report section summarizing the results of a particular drilling run may appear on different pages in different reports.

At substep 1222, report headers and footers are analyzed, for example to determine whether they repeat. If headers and footers (for example a page number) are repeated on multiple pages of a report, they may be excluded from the evaluation of any particular section.

At substep 1223, logos may be detected and their location recorded. This may be useful, for example, if information about the source of the report may be extracted from the logo. On the other hand, if the logo does not contain useful information, recording its position and location may allow it to ignored when mapping the report.

At substep 1224, date and location fields may be identified such that if the section presents information specific to a certain date or location, that information is mapped for extraction. Similarly, at substep 1225, wellsite information fields may be identified and mapped for extraction. In this way, the remaining data in the section may later be related to the specific date, location, and wellsite information mapped in sections 1224 and 1225.

At substeps 1226-1233, the remaining data in the section may be mapped. For example, by identifying secondary and tertiary subheadings, unit subheadings, and table specifications (such as vertical and horizontal dividers, row and column numbers, cell color-coding, and line-width changes). In certain embodiments, a specific template may store information regarding a minimum, maximum, and typical number of pages as well as characteristic paper size and orientation.

Additional substeps may be added to step 1220 according to the needs and format of particular macroscopic reports. In this way, a mapping table may be created for each possible section that specifies the anticipated organization of data for retrieval in the extraction process of step 1135. The mapping table may be dynamic so that even if a section in a specific macroscopic report being mapped "accordions" from the report used to build the mapping table—such as by containing more or less data in the section, containing more than one of the same section (for example, repeating the same section for different dates or different wellsites), or omitting the section—all data present may be mapped for extraction.

At end step 1235, the collection of mapping tables generated by successive iterations of step 1220 may be aggregated to create a mapping template.

FIG. 13 is a flowchart showing one embodiment of steps for template mapping a macroscopic report, according to the present disclosure. Although the flowchart of FIG. 12 is discussed below with respect to a single macroscopic report, multiple similar macroscopic reports may be processed. For example, before using the embodiment of FIG. 11 in an operational environment, the embodiment of FIG. 12 may be applied to numerous sample reports in order to ensure that robust templates are developed for mapping similar reports in the future.

At step 1300, a macroscopic report has been matched to a template, as discussed with respect to step 1105, and the template has been successfully used to map the report, as discussed with respect to step 1130.

At step 1305, the mapping template may be used to mine information from the macroscopic report and store it in a standardized output format, such as an SQL database. The mining process may comprise, for example, using information stored in the mapping template to identify the location and format of relevant data in the report. In certain embodiments, the mapping template may be used to identify a table in the report, and the boundaries between rows and columns may automatically be identified by, for example, the detection of horizontal and vertical lines. The mapping template may specify the significance of the data in each cell of the table; for example, a template may specify that each row of a table contains casing parameters and that the first column specifies casing depth and the second casing size.

At step 1310, administrative control may optionally be exercised if necessary. For example, if the automatic detection process encounters unexpected data, the administrator may manually intervene to determine how to extract the data, for example by adding additional SQL containers. The information mining may then resume at step 1305.

At step 1315, positional relationships between data may also be noted, for example by adding information to the SQL database. This may provide context that may be useful for later evaluation of the data, for example during the naive Bayesian classification at step 1145.

At step 1320, if the information mined at step 1305 is not already in a readable format, optical-character recognition processes known to those of skill in the art may be applied. This step may be aided by information contained in the template; for example, the template may specify language or font information that may be useful for accurate optical-character recognition.

At step 1325, administrative control may optionally be exercised if necessary. For example, if a specific character cannot be automatically recognized by optical-character recognition procedures, the administrator may manually identify the character. If more significant issues with the data mining are identified, for example if the template mapping fails to properly identify data content based on context, then the administrator may optionally revise the parameters or templates used for the mapping and extraction procedure, and it may resume at step 1300.

At end step 1330, information extracted from the macroscopic report, as well as relevant context information, may be stored in an SQL database.

Time-Aligning Data and Verifying Interpretation

Figure 14:
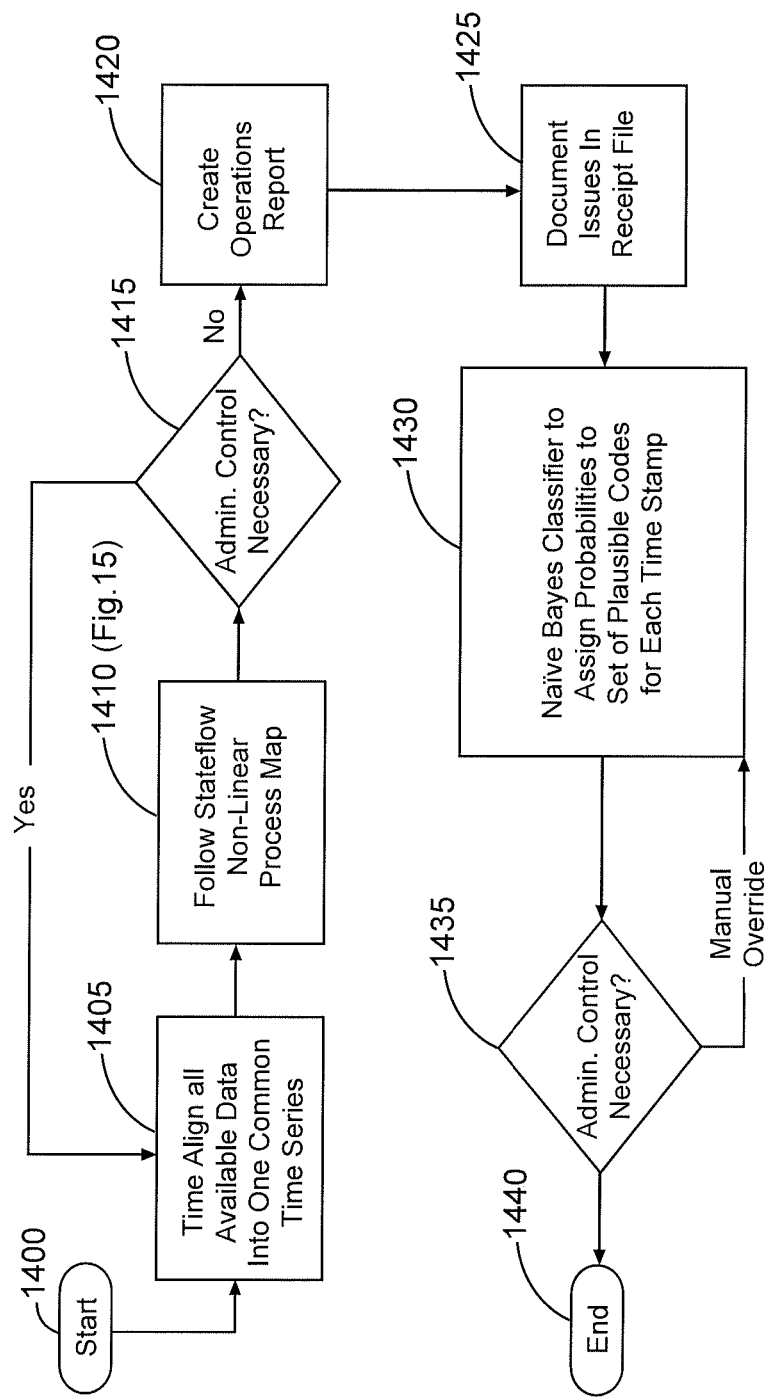
FIG. 14 is a flowchart showing one embodiment of steps for time-aligning data and verifying interpretation, according to the present disclosure.

FIG. 14 is a flowchart showing one embodiment of steps for time-aligning data and verifying interpretation, according to the present disclosure. At step 1400, real-time data may have been collected and pre-processed, for example according to the embodiment of FIG. 5 discussed above, and macroscopic report data may have been extracted and interpreted, for example according to the embodiment of FIG. 11 discussed above.

At step 1405, the data from all available sources may be aggregated and organized into a common database. The data may be arranged into a common time series based on the available time-stamps so that information from real-time data sources is aligned with data from the same time-stamps in the macroscopic reports. For example, a macroscopic report indicating a drilling operation was conducted during a certain time may be aligned with all real-time data collected during that time relating to, e.g., weight-on-bit, torque, etc.

Figure 15:
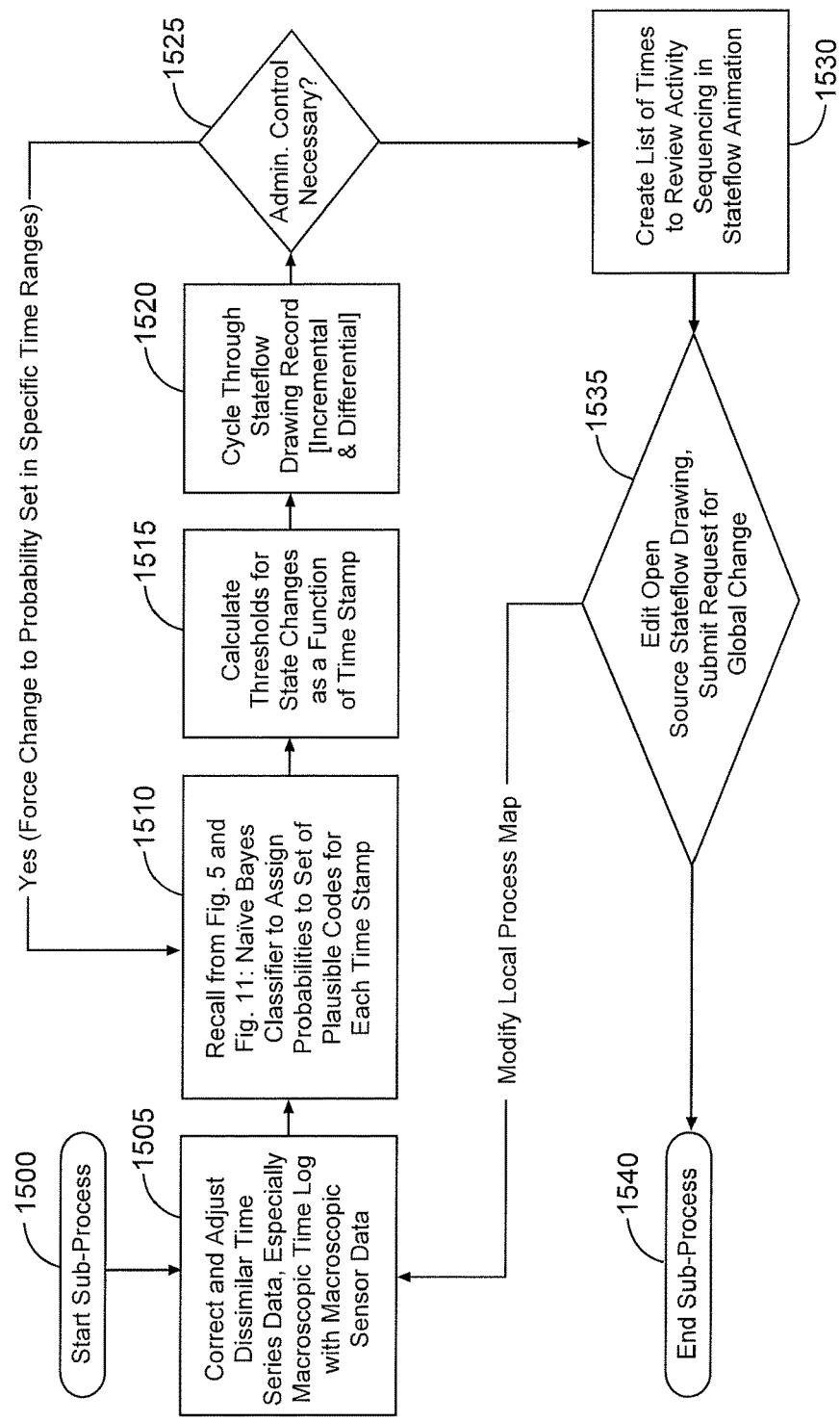
FIG. 15 is a flowchart showing one embodiment of steps for following a non-linear process map, according to the present disclosure.

At step 1410, non-linear process map models may be used to correct and adjust incongruous time series data or identify operational irregularities. For example, although the real-time and macroscopic data may be collected and time-stamped, the information may not be consistent. The data in macroscopic reports may be described only in granularity of 15- or 30-minute intervals (compared to minute or second granularity for real-time data), may be manually logged, and/or may not be logged until several hours after relevant events, leading to potential ambiguities and inaccuracies. Non-linear process map models may be used to resolve those apparent ambiguities or inaccuracies. A commercially available software package that may be used to implement non-linear process map models is Stateflow® by Math-Works. An embodiment for using non-linear process map models is shown in FIG. 15 and discussed below.

At step 1415, administrative control may optionally be exercised if necessary. For example, if ambiguities in the time-aligned data are not automatically resolved by following the non-linear process map, an administrator may intervene to manually correct the information. Following any necessary administrative intervention, the time-alignment procedure may resume at step 1405.

At step 1420, the time-aligned data may be used to create an operations report. The operations report may provide a comprehensive summary of all known wellsite information based on the time-aligned real-time and macroscopic report data. For example, the report may present a summary of all wellsite operator activities as well as associated, relevant real-time data measured during those activities.

At step 1425, any issues identified during the process of time aligning the data (steps 1405 through 1415) and/or preparing the operations report (step 1420) may be documented in a receipt file. The preparation of a receipt file may be similar to the steps taken for preparing a receipt file after correcting the real-time data, as discussed above with respect to FIG. 9.

At step 1430, the aggregated, time-aligned data may be analyzed using a naive Bayesian classifier to assign probabilities to plausible drilling or other codes on a timestamp-by-timestamp basis. This process may be similar to the steps taking for performing similar Bayesian analysis of the real-time data (steps 555 and 560) and macroscopic report data (1145), discussed above.

At step 1435, administrative control may optionally be exercised if necessary to manually override the results of the naive Bayesian classifier.

Thus, according to the embodiment of FIG. 14, at end step 1440 a complete record of wellsite operations data may have been aggregated from real-time and macroscopic reports, time-aligned and corrected, and assigned probabilistic drilling codes.

FIG. 15 is a flowchart showing one embodiment of steps for following a non-linear process map, according to the present disclosure. At step 1500, real-time and macroscopic data has been aggregated into a preliminary time-alignment based on the available time stamp information. Additionally, non-linear process maps may have been created, for example using Stateflow®, that correspond to wellsite operation procedures. In this way, the time-aligned well-site data may be imported into Stateflow® so that a user may "watch" a visual recreation of the wellsite operation procedures reflected by the time-aligned data. For example, the time-aligned data for a standard drilling operation may include hundreds or thousands of datapoints. But by importing that data into an appropriately designed non-linear process map, a high-level animation may be created that shows the drill operator performing routine steps such as making a connection while the drill pipe is in slips, picking it up out of the slips, beginning rotation and lowering to bottom, and starting drilling once at bottom.

At step 1505, corrections and adjustments may be made to the time-aligned data. Although various adjustments may be made, in particular, adjustments may be made to correct ambiguous or potentially inaccurate data from macroscopic reports based on clarifying real-time data. For example, a wellsite operator may have misrecorded the time that a drilling operation began, but that error may be corrected by comparing to the real-time data showing precise timestamps when, e.g., drill rotation was observed.

At step 1510, the drilling code probabilities previously assigned by the naive Bayesian classifier (for example in steps 560 for the real-time data and 1145 for the macroscopic report data) may be recalled for the time-aligned data.

At step 1515, the drilling code probabilities for each data set may be analyzed and correlated into changes in state on the non-linear process map. In this way, a state flow timing and sequence record may be constructed for each respective data set. Thresholds may be set so that state changes occur only after clear confirmation from the probabilistic drilling code information. Thus, temporary incorrect drilling code predictions (which may be caused by inaccurate information) may be ignored in the state flow timing and sequence record.

At step 1520, the state machine timing and sequence record may be cycled through in the non-linear process map. Records may be created of any disagreement between the state machine generated from the real-time data as compared to the state flow generated from the macroscopic reporting data. In certain embodiments, algorithmic routines may be provided to automatically adjust time alignments in the event of any disagreement.

At step 1525, administrative control may optionally be exercised if necessary where records of disagreement between the two datasets are observed in step 1520. A disagreement may be caused by improper time alignment or incorrect assignment of probabilities to drilling codes by the naive Bayesian classifier. The administrator may intervene to further correct the time alignment or may manually override the automatically-predicted drilling codes. Review may resume at step 1510.

At step 1530, any remaining irregularities in time-alignment between the real-time and macroscopic datasets may be the result of errors in the non-linear process map. A list of timestamps where irregularities remain may be created.

At step 1535, the non-linear process map may be reviewed to determine whether the irregularities noted in step 1530 are caused by errors in the non-linear process map. If so, the non-linear process map may be amended to correct the error, and the time-alignment process may be resumed at step 1505.

At end step 1540, a complete record of wellsite operations data, from real-time and macroscopic reports, may have been aggregated and time-aligned.

Data Analysis and Reporting

Figure 16:
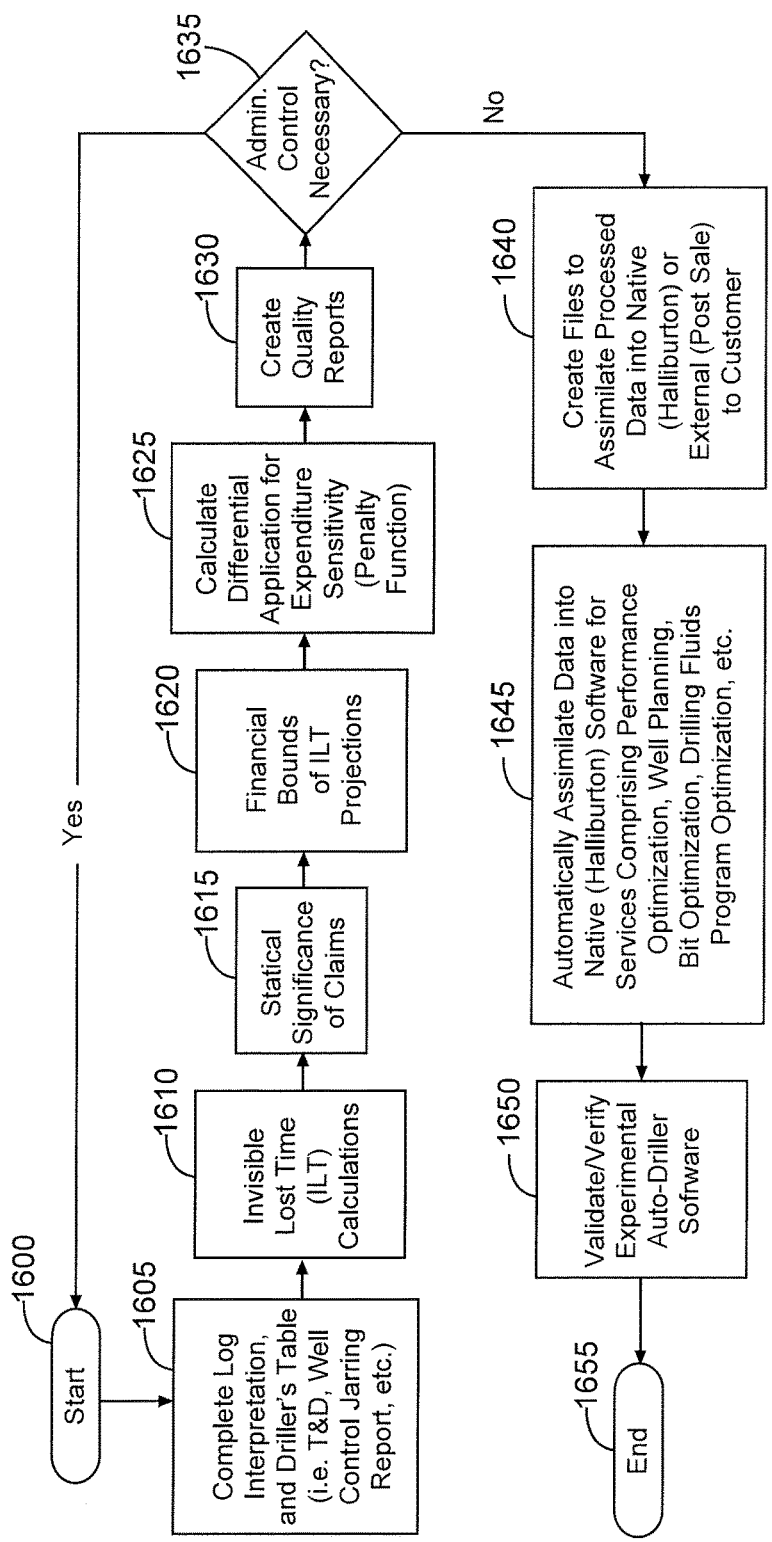
FIG. 16 is a flowchart showing one embodiment of steps for data analysis and reporting, according to the present disclosure.

FIG. 16 is a flowchart showing one embodiment of steps for data analysis and reporting, according to the present disclosure. At step 1600, real-time and macroscopic report data may have been collected, corrected, and time-aligned, for example according to the embodiment of FIG. 14 discussed above; a QA/QC cover report may have been prepared, for example according to the embodiment of FIG. 5 at steps 525 through 545; and an operations report may have been prepared, for example according to the embodiment of FIG. 14 at step 1420.

The data analysis and reporting steps described below may include data analysis and reporting processes known to those of skill in the art. However, such data analysis and reporting may be difficult and time consuming when data may be fragmented across different data sources, unstandardized, and/or contain errors. Thus, data analysis and reporting may be improved due to the availability of collected, corrected, and time-aligned data as discussed above. Moreover, because of the availability of homogenized datasets, manual analysis may be replaced by automated algorithmic procedures.

At step 1605, well log reports may be automatically produced using the time-aligned data, or pre-existing reports (for example, the driller diary of torque and drag measurements) may be supplemented. Additionally, the interpretation of the well log reports may be automated by algorithmic data analysis procedures known to those of skill in the art.

At step 1610, invisible lost time ("ILT") calculations may be performed. ILT calculations may identify relatively small drilling operation inefficiencies that may aggregate to significant lost time. For example, an ILT analysis may identify that during a particular type of drilling operation, one oil rig regularly spends three minutes in slips, while other oil rigs in the same area spend an average of only forty-five seconds in slips.

Although ILT analysis is known to those of skill in the art, current approaches may use relatively static analysis for ILT calculations. For example, current ILT analysis may consider only rigid, single-dimension measurements such as evaluating time drilling on bottom separately from time drilling circulating. The availability of time-aligned and homogenized data, according to the present disclosure, may enable more dynamic calculations. For example, a hierarchical process map may be created in process map software, such as Stateflow® discussed above with respect to the embodiment of FIG. 15. The hierarchical process map may define both states and substates so that dynamic analysis may be performed. For example, a top level timing event state may trigger for drilling on bottom, then various substates may be individually activated and timed for rotating, sliding, or circulating. In this way, with properly defined process maps, ILT analysis may be performed so as to dynamically cross-correlate various related data.

At step 1615, the statistical significance of ILT claims may be evaluated. For example, ILT calculations from a small sample of wellsites (such as calculations made in step 1610) may be used to make broader claims regarding wellsite performance. The statistical significance of those claims may be evaluated, for example using algorithmic statistical evaluations known to those of skill in the art, in order to determine whether extrapolations from a smaller sample are supported.

At step 1620, the statistical significance of financial ILT claims may be evaluated. ILT calculations, for example from steps 1610 or 1615, may be used to predict financial impacts. In this way, the cost resulting from operational inefficiencies measured by ILT may be estimated, and costs may be projected, for example on a yearly basis or for multiple wellsites. This data may be used to quantify the costs from underperforming wellsites. The statistical significance of those cost estimates may be evaluated, for example using algorithmic statistical evaluations known to those of skill in the art. The cost information generated by this ILT analysis may be aggregated across multiple wellsites and indexed based on, for example, drilling codes. In this way, it may be possible to estimate costs for individual drilling codes by looking at historical ILT calculations associated with that code.

At step 1625, cost data may be used for evaluating applications for expenditure. For example, wellsite operators may be asked to estimate the value associated with potential wellsite projects; this may be useful in making a competitive bid to provide services. Persons of skill in the art may be able to evaluate a potential wellsite project and determine the steps that may need to be taken during the project. Aggregated historical cost data, for example the cost data generated in step 1620, may be used to estimate the cost for each step that may be anticipated for the potential project. The anticipated costs may be used as a penalty function in assessing the value of the project and may, for example, affect a decision about the amount of a competitive bid.

At step 1630, quality reports may be generated and optionally stored into a global performance database. The quality reports may summarize the operational decisions made during the inquiry period and how they impacted wellsite efficiency. The quality reports may also cross-reference other data, such as comparing actual measured operational decisions with the drilling decisions that would have been anticipated based on available information. The data may be mined and presented from a variety of different perspectives. In certain embodiments, a quality report may focus on the operations of a specific wellsite to summarize information concerning the quality of wellsite operations. In other embodiments, a quality report may focus on a specific drill operator and report on efficiency metrics across the various wells on which that drill operator worked. In other embodiments, a quality report may focus on a particular component, such as a specific bit design, and present information on efficacy in various wellsite configurations and use cases. The quality reports may be used to improve operational efficiency, for example by diagnosing recurring operational inefficiencies that may be ameliorated through targeted training. Similarly, the reports may be used to identify team members or components with specific advantages—for example a drilling operator or drill bit particularly effective in a certain type of wellsite environment—that may be desirable for the particular needs of a project.

At step 1635, administrative control may optionally be exercised if necessary, for example because of errors in generating reports based on the input data. The administrator may intervene to take remedial action, such as by revising the routine that generated the error or manually overriding erroneous results. The reporting process may resume at start step 1600.

At step 1640, the reports generated in steps 1605 through 1635 may be output into useful formats. This may include an output file formatted to be compatible with various software packages, such as Halliburton's MaxActivity™ or WELL-PLAN™ or Schlumberger's Petrel®, as discussed above with respect to step 565. Moreover, the data included in the output may vary based on the intended audience. For example, an executive may wish to receive a higher-level summary of all operations; a wellsite operator may wish to receive granular data about a specific well; a drill bit salesman may wish to receive performance information only for specific drill bits. The output may also be contextual. For example, a wellsite report may include generally summary data, but any operational failure may be flagged and a supplemental report provided with specific details associated with that failure.

At step 1645, the output data of step 1640 may automatically be assimilated into native software. Different departments or organizations may use different software packages for managing data. The output data of step 1640 that is compatible with a particular software package may automatically be assimilated into that package.

At step 1650, wellsite data may be used to evaluate experimental techniques. For example, experimental auto-driller software algorithms may be tested against measured data to determine how the autodriller would have responded in real-time. The simulated autodriller operational decisions may be compared to the actual operational decisions made at the wellsite. If the autodriller is observed to take suboptimal courses of action in response to the observed data, the experimental algorithms may be adjusted. Alternatively, the autodriller decisions may be observed to be equivalent or superior to the decisions made by the drill operator.

Thus, according to the embodiment of FIG. 16, at end step 1655 time-aligned wellsite operations data may have been used to create and interpret well logs; perform ILT calculations and test the statistical significance of claims generated from those calculations; create ILT cost information for each drilling code, which may be used assess value in applications for expenditure; and produce various quality reports. The aggregated data may be exported into native and third-party usable formats, automatically assimilated into various tools, and may also be used to validate experimental auto-driller software.

Although the steps of FIGS. 5-16 are shown as discrete steps in a linear order, it may be understood in light of the present disclosure that the steps may overlap or be performed in a different order than the one shown.

An embodiment is a comprising collecting wellsite data from a plurality of sources, standardizing the wellsite data, correcting the wellsite data, time aligning the wellsite data, and producing a report based on the wellsite data.

The plurality of sources may optionally comprise a real-time data source and a macroscopic reports. Collecting wellsite data from the macroscopic report may comprise selecting a template associated with the macroscopic report and using the template to extract the data from the macroscopic report. Time aligning the wellsite data may comprise changing a first timestamp associated with a first wellsite measurement value taken from the macroscopic report based on a second timestamp associated with a second wellsite measurement value taken from the real-time data source.

Standardizing the wellsite data may comprise identifying at least one source of the wellsite data; selecting a template associated with the at least one source, wherein the template comprises instructions for processing wellsite data from that source; and applying the template to the wellsite data. The instructions for processing wellsite data may optionally comprise instructions for creating a data array sequence using the wellsite data.

Correcting the wellsite data may comprise selecting one or more data error lists associated with the wellsite data, wherein the data error lists comprise one or more instructions for identifying and correcting an error in the wellsite data; and applying the data error lists to the wellsite data to identify and correct one or more errors in the wellsite data. The instructions may optionally comprise at least one instruction for identifying and correcting an error in the wellsite data by comparing a first wellsite measurement value to a second wellsite measurement value. The first wellsite measurement value may optionally be obtained from a difference source than the second wellsite measurement value.

Producing the report may comprise selecting a template, wherein the template specifies one or more pass-fail criteria; determining a result by evaluating the wellsite data using the pass-fail criteria; and recording the test result in the report.

An embodiment is an information handling system comprising a memory device communicably coupled to a processor, the memory device containing a set of instruction that, when executed by the processor, cause the processor to collect wellsite data from a plurality of sources, standardize the wellsite data, correct the wellsite data, time align the wellsite data, and produce a report based on the wellsite data.

The plurality of sources may comprise a real-time data source and a macroscopic report. The set of instructions that cause the processor to collect wellsite data from at least one macroscopic report may optionally further cause the processor to select a template associated with the macroscopic report and use the template to extract the wellsite data from the macroscopic report. Additionally or alternatively, the set of instructions that cause the processor to time align wellsite data may optionally further cause the processor to change a first timestamp associated with a first wellsite measurement value taken from the macroscopic report based on a second timestamp associated with a second wellsite measurement value taken from the real-time data source.

The set of instructions that cause the processor to standardize the wellsite data may optionally further cause the processor to: identify at least one source of the wellsite data; select a template associated with the at least one source, wherein the template comprises template instructions for processing wellsite data from the source; and apply the template to the wellsite data. The template instructions may comprise instructions for creating a data array sequence using the wellsite data.

The set of instructions that cause the processor to correct the wellsite data may optionally further cause the processor to: select one or more data error lists associated with the wellsite data, wherein the data error lists comprise one or more error-list instructions for identifying and correcting an error in the wellsite data; and apply the data error lists to the wellsite data to identify and correct one or more errors in the wellsite data. The error-list instructions may comprise at least one error-list instruction for identifying and correcting an error in the wellsite data by comparing a first wellsite measurement value to a second wellsite measurement value. The first wellsite measurement value optionally may have been obtained from a different source than the second wellsite measurement value.

The set of instructions that cause the processor to produce the report may optionally further cause the processor to select a template, wherein the template specifies one or more pass-fail criteria; determine a result by evaluating the wellsite data using the pass-fail criteria; and record the result in the report.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces. Additionally, the terms "couple", "coupled", or "coupling" include direct or indirect coupling through intermediary structures or devices.

What is claimed is:

1. A method of time-aligning wellsite data for use in a drilling system comprising:
    collecting wellsite data from a plurality of sources at an information handling system;
    standardizing said wellsite data;
    correcting said wellsite data;
    producing a report based on said wellsite data;
    applying a filter grid to the report to identify one or more sections of the report based on at least one of one or more dividers and one or more language characteristics;
    generating one or more mapping tables for each of the one or more identified sections, wherein the one or more mapping tables specify at least one of an organization, format and data content of each of the one or more identified sections, and wherein generating the mapping table comprises identifying one or more date and location fields for extraction;
    aggregating the one or more mapping tables to create a mapping template;
    mining information from the report based on the mapping template;
    storing the information in a standardized output format;
    aligning the information stored in the standardized output format with other information based on a time-stamp to create time-aligned data;
    analyzing the time-aligned data using a naive Bayesian classifier, wherein analyzing the time-aligned data comprises assigning one or more probabilities to one or more drilling codes;
    providing an animation of time-aligned data; and
    constructing a state flow timing and sequence record based on the one or more probabilities assigned to the one or more drilling codes.

2. The method of claim 1, wherein said plurality of sources comprises a real-time data source and a macroscopic report.

3. The method of claim 2, wherein collecting wellsite data from said macroscopic report comprises:
    selecting a template associated with said macroscopic report; and
    using said template to extract said wellsite data from said macroscopic report.

4. The method of claim 2, wherein time aligning wellsite data comprises:
    changing a first timestamp associated with a first wellsite measurement value taken from said macroscopic report based on a second timestamp associated with a second wellsite measurement value taken from said real-time data source.

5. The method of claim 1, wherein standardizing said wellsite data comprises:
    identifying at least one source of said wellsite data;
    selecting a template associated with said at least one source, wherein said template comprises instructions for processing wellsite data from said source; and
    applying said template to said well site data.

6. The method of claim 1, wherein correcting said wellsite data comprises:

selecting one or more data error lists associated with said wellsite data, wherein said data error lists comprise one or more instructions for identifying and correcting an error in said wellsite data; and applying said data error lists to said wellsite data to identify and correct one or more errors in said wellsite data.

7. The method of claim 6, wherein said instructions comprise:

at least one instruction for identifying and correcting an error in said wellsite data by comparing a first wellsite measurement value to a second wellsite measurement value.

8. The method of claim 7, wherein said first wellsite measurement value was obtained from a different source than said second wellsite measurement value.

9. The method of claim 1, wherein producing said report comprises:

selecting a template, wherein said template specifies one or more pass-fail criteria;

determining a result by evaluating said wellsite data using said pass-fail criteria; and recording said result in said report.

10. The method of claim 1, wherein said report is based on wellsite data from a plurality of wellsites.

11. An information handling system comprising:

a memory device communicably coupled to a processor, the memory device containing a set of instruction that, when executed by said processor, cause said processor to:

collect wellsite data from a plurality of sources associated with a drilling system;

standardize said wellsite data;

correct said wellsite data;

produce a report based on said wellsite data;

apply a filter grid to the report to identify one or more sections of the report based on at least one of one or more dividers and one or more language characteristics;

generate one or more mapping tables for each of the one or more identified sections, wherein the one or more mapping tables specify at least one of an organization, format and data content of each of the one or more identified sections, and wherein generating the mapping table comprises identifying one or more date and location fields for extraction;

aggregate the one or more mapping tables to create a mapping template;

mine information from the report based on the mapping template;

store the information in a standardized output format;

align the information stored in the standardized output format with other information based on a time-stamp to create time-aligned data;

analyze the time-aligned data using a naive Bayesian classifier, wherein analyzing the time-aligned data comprises assigning one or more probabilities to one or more drilling codes;

provide an animation of time-aligned data; and construct a state flow timing and sequence record based on the one or more probabilities assigned to the one or more drilling code.

12. The system of claim 11, wherein said plurality of sources comprises a real-time data source and a macroscopic report.

13. The system of claim 12, wherein said set of instructions that cause said processor to collect wellsite data from at least one macroscopic report further cause said processor to:

select a template associated with said macroscopic report; and use said template to extract said wellsite data from said macroscopic report.

14. The system of claim 12, wherein said set of instructions that cause said processor to time align wellsite data further cause said processor to:

change a first timestamp associated with a first wellsite measurement value taken from said macroscopic report based on a second timestamp associated with a second wellsite measurement value taken from said real-time data source.

15. The system of claim 11, wherein said set of instructions that cause said processor to standardize said wellsite data further cause said processor to:

identify at least one source of said wellsite data;

select a template associated with said at least one source, wherein said template comprises template instructions for processing wellsite data from said source; and apply said template to said wellsite data.

16. The system of claim 11, wherein said set of instructions that cause said processor to correct said wellsite data further cause said processor to:

select one or more data error lists associated with said wellsite data, wherein said data error lists comprise one or more error-list instructions for identifying and correcting an error in said wellsite data; and apply said data error lists to said wellsite data to identify and correct one or more errors in said wellsite data.

17. The system of claim 16, wherein said error-list instructions comprise:

at least one error-list instruction for identifying and correcting an error in said wellsite data by comparing a first wellsite measurement value to a second wellsite measurement value.

18. The system of claim 17, wherein said first wellsite measurement value was obtained from a different source than said second wellsite measurement value.

19. The system of claim 11, wherein said set of instructions that cause said processor to produce said report further cause said processor to:

select a template, wherein said template specifies one or more pass-fail criteria;

determine a result by evaluating said wellsite data using said pass-fail criteria; and record said result in said report.

20. The system of claim 11, wherein said report is based on wellsite data from a plurality of wellsites.

* * * * *